United States Patent [19]
Asai et al.

[11] Patent Number: 5,086,439
[45] Date of Patent: Feb. 4, 1992

[54] ENCODING/DECODING SYSTEM UTILIZING LOCAL PROPERTIES

[75] Inventors: Kohtaro Asai; Tokumichi Murakami; Yuri Hasegawa, all of Kanagawa, Japan

[73] Assignee: Mitsubishi Denki Kabushiki Kaisha, Tokyo, Japan

[21] Appl. No.: 510,140

[22] Filed: Apr. 17, 1990

[30] Foreign Application Priority Data

| Apr. 18, 1989 | [JP] | Japan | 1-99084 |
| May 12, 1989 | [JP] | Japan | 1-119238 |
| Oct. 3, 1989 | [JP] | Japan | 1-259287 |
| Dec. 28, 1989 | [JP] | Japan | 1-343822 |

[51] Int. Cl.⁵ ............................................. H04N 7/18
[52] U.S. Cl. ........................................ 375/122; 341/65; 341/67; 358/133
[58] Field of Search .............. 375/27, 122; 358/133, 358/136; 382/56; 341/65, 67, 106; 371/37.8

[56] References Cited

U.S. PATENT DOCUMENTS

| 4,122,440 | 10/1978 | Langdon, Jr. et al. | 341/65 |
| 4,878,230 | 10/1989 | Murakami et al. | 358/136 |
| 4,882,585 | 11/1989 | Beard | 341/106 |
| 4,958,225 | 9/1990 | Bi et al. | 341/106 |
| 4,965,580 | 10/1990 | Tasaki et al. | 341/106 |
| 4,982,285 | 1/1991 | Sugiyama | 358/136 |
| 4,992,954 | 2/1991 | Takeda et al. | 341/65 |

Primary Examiner—Benedict V. Safourek
Attorney, Agent, or Firm—Wolf, Greenfield & Sacks

[57] ABSTRACT

An encoding/decoding system for sequentially encoding input digital signals and sequentially decoding the encoded signals on the basis of the frequency of occurrence of the input digital signals, thereby improving an encoding efficiency. In a variable length encoding/decoding system, sequential lists of encoded values are used in an encoder and sequential lists of decoded values are stored in a decoder for utilizing the frequency of occurrence of the signals. In a vector quantization encoding/decoding system, the frequency of occurrence of input image signals is used to produce code books for storing vectors that are adjacent to an input vector and to form a block using the input image signals located in the same area in consecutive frames.

12 Claims, 17 Drawing Sheets

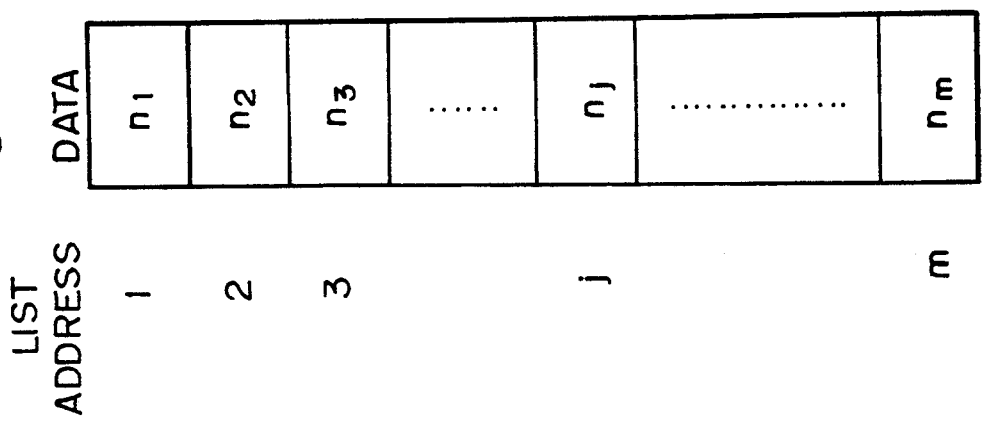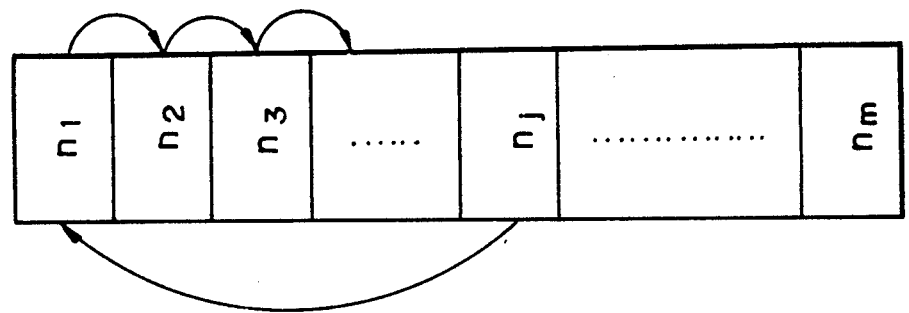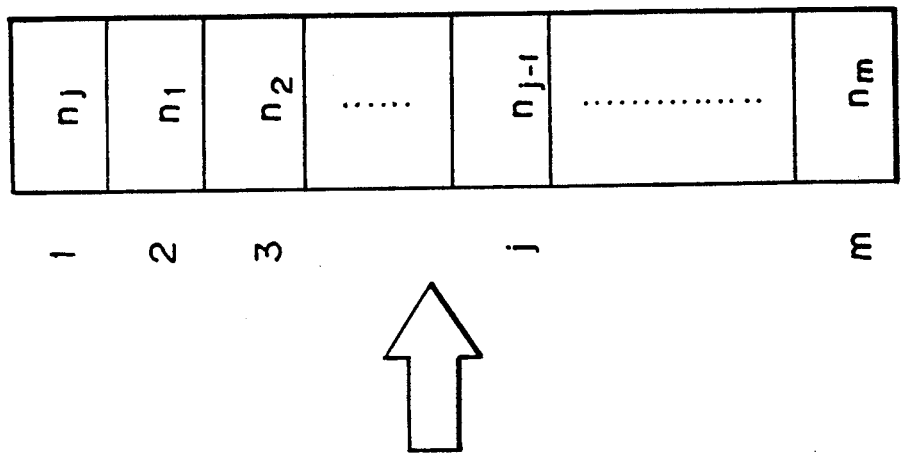

■: INPUT VECTOR
|||: QUANTIZED AREA

■: INPUT VECTOR
≡: UNIQUE BLOCK

ENCODING/DECODING SYSTEM UTILIZING LOCAL PROPERTIES

BACKGROUND OF THE INVENTION

1. Field of the Invention

The present invention relates to an encoding/decoding system adapted to encode and decode signals with a high efficiency and, in particular, to an encoding/decoding system which improves an encoding efficiency by utilizing local properties between the signals.

2. Description of Prior Art

As basic technologies for encoding input information with a high efficiency by suppressing redundant information, methods of variable length encoding and vector quantization are known.

FIG. 1 is a block diagram schematically illustrating the constitution of an encoding/decoding system according to the prior art. In FIG. 1, an encoding section 200 comprises an encoder 202 and a variable length encoder 204, while a decoding section 206 comprises a variable length decoder 208 and a decoder 210.

Operation of this system will next be explained.

An input signal 212 is encoded with a high efficiency by the encoder 202 to provide encoded data 214. The encoded data 214 is, in turn, subjected to variable length encoding by the variable length encoder 204 and transmitted as code word 216.

At the side of the decoder 206 on the other hand, the code word 216 transmitted from the encoding section 200 is subjected to variable length decoding by the variable length decoder 208 and decoded by the decoder 210 to provide an output signal 218.

The allocation of the variable length codes is executed at the variable length encoder 204 depending on the probability of occurrence of such encoded data in such a way that a shorter code word is allocated to data having a higher rate of occurrence and a longer code word is allocated to data having a lower rate of occurrence.

The encoding/decoding system as explained above does not utilize such local properties of the input signals that if there is a correlation between adjacent signals, the probability of the same value occurring consecutively is expected to be high. Accordingly, the encoding efficiency is not sufficiently high.

Vector quantization is known as a technology of band compression encoding of image signals. FIG. 2 is a block diagram schematically illustrating a general constitution of an encoding/decoding system which employs vector quantization technology. An encoding section 220 comprises a vector quantization encoder 222 and a code book 224, while a decoding section 226 comprises a vector quantization decoder 228 and a code book 230. The code books 224, 230 are memories which store a plurality of quantization representative vectors and adapted to provide read quantization representative vectors to the vector quantization encoder 222 and the vector quantization decoder 228. The vector quantization encoder 222 is adapted to vector-quantize an input vector 232 by using the quantization representative vectors supplied from the code book 224 and output an index of the quantization representative vector as encoded data. On the other hand, the vector quantization decoder 228 is adapted to decode the received index in accordance with the quantization representative vectors supplied from the code book 230 and reproduce a signal as a decoded vector 234.

An operation of the system constituted as described above will next be explained.

Now, assuming an input K dimensional vector 232 is to be expressed as follows:

$$X = [X_1, X_2, \ldots, X_K] \quad (1)$$

A representative quantization vector $Y_i$ stored in the code book 224 is assumed to be expressed as follows:

$$Y_i = [Y_{i1}, Y_{i2}, \ldots, Y_{iK}] \quad (2)$$

A set of this vector $Y_i$ is expressed as $$[Y] = [Y_1, Y_2, \ldots, Y_N] \quad (3)$$

In this case, at the vector quantization encoder 222, an index i of the respective quantization vector which enables a distortion $d_i$ of the input vector 232 defined by the following equation to be minimum is decided:

$$d_i = ||X - Y_i||^2 = \sum_{j=1}^{K} (X_j - Y_{ij})^2 \quad (4)$$

provided $d_i < d_l$ for all $l \neq i$.

From the vector quantization encoder 222, the index i for identifying the representative quantization vector $Y_i$ is output and transmitted as the encoded data.

As explained above, the transmitted encoded data are input to the vector quantization decoder 228. In this decoder, the representative quantization vector $Y_i$ corresponding to the index i provided by the encoded data is read out of the code book 230 and the decoded vector 234 is reproduced as a vector expressed by the following equation:

$$\hat{X} = Y_i \quad (5)$$

According to the vector quantization system as explained above, when the number of dimension is high, it is difficult to completely optimize all the definite number of representative quantization vectors to be stored in the code books 224, 230 for all the input vectors. Besides, encoding efficiency is not satisfactory since such local properties of the input vectors as a correlation between the adjacent input vectors and the line are not taken into consideration.

FIG. 3 is a block diagram illustrating an example of the constitution of the vector quantization encoding section 220 and FIG. 4 is a block diagram illustrating an example of the constitution of the vector quantization decoding section 226. In FIG. 3, a mean value separation circuit 236 is used to separate a mean value from the input vector 232. A code book 224 stores normalized output vectors. The address for reading the code book 224 are provided by an address counter 238. Inner products of the input vector from which the mean value has been separated and the normalized output vectors are obtained by an inner product calculating circuit 240. A maximum inner product detection circuit 242 detects the largest inner product among the inner products and outputs a detection signal to an index latch 244 as well as outputting the inner product value at this instance as a gain. An output from the address counter 238 is then latched in the index latch 244 as a vector quantization index as a result of vector quantization of its input vector 232 in accordance with the detection signal output from the maximum inner product detection circuit 242. The mean value of the input vector 232 and the maximum inner product value (gain) are DPCM-encoded by the DPCM encoding circuits 246, 248, respectively. The DPCM encoded mean value, DPCM encoded gain and the index are then subjected to variable length encoding by a variable length encoding circuit 250 and are thereby output as encoded data 252. The encoded data 252 transmitted from the encoder 250 are, in turn, subjected to variable length decoding by a variable length decoding circuit 254. The variable length decoded mean value and gain are then subjected to DPCM decoding by the DPCM decoding circuits 256, 258, respectively. The variable length decoded index is latched by an index latch 260 and a normalized output vector corresponding to the index is output from the code book 230. The product of the decoded normalized output vector and the decoded gain is obtained by a gain factor multiplier 262. An output from the gain factor multiplier 262 and the decoded mean value are added at a mean value adder 264 and a decoded reproduced vector 266 is obtained.

An operation of the system as described above will next be explained.

From a sequence of signals 232 input as a K dimensional input vector $S=[S_1, S_2, \ldots, S_K]$, the mean value $\mu$ is separated by the mean value separation circuit 236 and the input vector is converted to a vector $X^*$. Those $\mu$ and $X^*$ are expressed as follows:

$$\mu = (1/k) \sum_{l=1}^{K} S_l$$

$$X^*_l = S_l - \mu$$
$$X^* = [X^*_1, X^*_2, \ldots, X^*_K]$$

The DPCM encoding circuit 246 removes any redundancy from the mean value $\mu$ and DPCM signal $\epsilon_\mu$ is output therefrom. The mean-value-separated vector $X^*$ is subjected to the following vector quantization encoding processing by the inner product calculating circuit 240. Firstly, a mean value $\mu$ is separated from the input vector formed from a model sequence of signals S so as to produce the mean-value-separated vector $X^*$. Then, a set of a plurality of normalized output vectors $y_i$ (i=1, 2, ..., N) is produced by using a clustering method based on the statistical characteristics of a normalized vector X which is formed by normalizing the vector $X^*$ by the amplitude component of the vector $X^*$, i.e., the standard deviation $\sigma$. The thus produced set is written in the code book 224. Those $\sigma$, X and $X^*$ are expressed as follows:

$$\sigma = \left[ \sum_{l=1}^{K} (X^*_l)^2 \right]^{\frac{1}{2}}$$

$$X_l = X^*_l/\sigma = (S_l - \mu)/\sigma$$
$$X = [X_1, X_2, \ldots, X_K]$$

At the time when the mean-value-separated vector $X^*$ is input to the inner product calculating circuit 240, the address counter 238 outputs the address information i in the order of i=1, 2, ..., N and the normalization output vector $y_i$ corresponding to each address information i is read out from the code book 224. Then the inner product $P(X^*, y_i)$ of the mean-value-separated vector $X^*$ and N normalization output vectors $y_i$ is calculated by the inner product calculating circuit 240 in accordance with the following equation and the results of the calculation are compressed successively with each other.

$$P(X^*, y_i) = \sum_{l=1}^{K} (X^*_l \cdot y_{il})$$

The maximum inner product $P_{max}$ is detected by the maximum inner product detection circuit 242 among N inner products obtained as a result of the calculation, and the address information i corresponding to the maximum inner product is taken as the detection signal in the index latch 244 which in turn outputs the normalization output index i. The maximum inner product $P_{max}$ detected is then input to DPCM encoding circuit 248 as the gain g, and the redundant component is removed from the maximum inner product, the DPCM signal $\epsilon_g$ is output.

The DPCM signal $\epsilon_\mu$ of the mean value, the DPCM gain $\epsilon_g$ and the index i of the normalized output vector are subjected to variable length encoding by the variable length encoding circuit 250 and transmitted as the encoded data 252.

An operation of the vector quantization decoding will next be explained.

Firstly, the DPCM signal $\epsilon_\mu$ of the mean value $\mu$, the DPCM signal $\epsilon_g$ of the gain g and the index i of the normalization output vector are decoded successively by the variable length decoding circuit 254 from the encoded data 252 which have been transmitted from the encoding section 220.

Then a value $\overline{\mu}$ corresponding to the mean value $\mu$ is decoded and reproduced by DPCM decoding circuit 256. Also, a value $\overline{g}_i$ corresponding to the gain $g_i$ is decoded and reproduced by DPCM decoding circuit 258.

The decoded index i of the normalization output vector is taken into the index latch 260 which causes the normalization output vector $y_i$ corresponding to the normalization output vector index i to be read out of the code book 230 in which the same content as the code book 224 is written.

The decoded gain $g_i$ is multiplied with the normalization output vector $y_i$ at the gain factor multiplier 262 and the resulting product is added to the decoded mean value $\mu$ at the mean value adder 264 whereby the decoded reproduced vector $\overline{S}$ can be obtained. In other words, the following operations are executed:

$$\overline{S}_j = \overline{g}_i y_{ij} + \overline{\mu}$$

$$\overline{S} = [S_1, S_2, \ldots, S_K]$$

In the vector quantization encoding/decoding system constituted as explained above, the variable length code allocation is executed without utilizing such local inclinations that the same values are successively selected due to correlation between adjacent vectors, and this is disadvantageous in respect of encoding efficiency.

As explained above, local properties such as a correlation between input signals are not utilized in the encoding/decoding systems according to the prior art.

In the meantime, the Japanese Patent Publication No. 63-26951 published on June 1, 1988 discloses an interframe encoding system adapted to encode image signals with a high efficiency by utilizing a correlation among the image signals in consecutive frames. According to this interframe encoding system, as shown in FIG. 5, 4×4 samples on adjacent four scanning lines in the n-th frame are grouped into a block. This block forms a vector $S_n=[S_1, S_2, \ldots, S_{16}]_n$, and is designated as $A_f^n$ indicating that this block is the f-th block in the n-th frame. Similarly, samples in a block $A_f^{n+1}$ located at the same position in the (n+1)-th frame as that of the block $A_n$ in the n-th frame are designated as a vector $S_{n+1}=[S_1, S_2, \ldots, S_{16}]_{n+1}$. Then the respective samples of the image signal vector $S_n$ in the n-th frame are subtracted from the corresponding samples of the image signal vector $S_{n+1}$ in the (n+1)-th frame, so that an interframe differential signal vector $X_{n+1}=[X_1, X_2, \ldots, X_{16}]_{n+1}$ is obtained. This signal vector $X_{n+1}$ is vector-quantized in the 16-dimensional Euclidean signal space, whereby a highly efficient encoding or the reduction in bit rate can be realized.

FIG. 6 is a block diagram schematically illustrating the constitution of an encoder employed in such an interframe encoding system. In FIG. 6, the reference numeral 268 designates a scan converting buffer adapted to convert raster scanning to block scanning; 270 a subtracter adapted to execute subtraction between frames; 272 a vector quantization encoder; 274 a vector quantization decoder; 276 an adder adapted to execute addition between frames; and 278 a frame memory adapted to temporarily store a sequence of signals decoded locally.

An operation of this system will next be explained. A sequence of input digital image signals 280 is rearranged by the scan converting buffer 268 from the order of raster scanning to the order of block scanning. In other words, the horizontally scanned image signals are converted in such an order that the sequence of the signals contained in the block $A_n$ as shown in FIG. 5 is serially arranged. At the subtracter 270, a signal sequence 284 previously encoded and decoded is subtracted as a predicted signal sequence from the sequence of signals 282 arranged in the order of block scanning. Then a predicted error signal sequence 286 thus obtained is subjected to vector quantization at the vector quantization encoder 272, whereby the vector quantization index 288 is output. The vector quantization index 288 is decoded by the vector quantization decoder 274 and added to the predicted signal sequence 284 to become a decoded image signal sequence 290 which is temporarily stored in the frame memory 278 for use in prediction of the next frame. The operation as explained above will be described more specifically by referring to FIG. 5. When the block of the present frame $A_f^n$ is input, the decoded block $A_f^{n-1}$ located at the same space position is used as the predicted signal sequence and a differential block $A_f^n-A_f^{n-1}$ is subjected to vector quantization. Then the predicted block $A_f^{n-1}$ and the differential block are added and the block $A_f^n$ of the present frame is decoded. In other words, a sequence of decoded signals of one frame is utilized for prediction of a sequence of signals for the next frame.

FIG. 7 is a block diagram schematically illustrating the constitution of a decoder adapted to reproduce signals corresponding to those transmitted from the encoder shown in FIG. 6. In FIG. 7, the reference numeral 292 designates a vector quantization decoder; 294 an adder adapted to execute addition between frames; 296 a frame memory adapted to temporarily store a sequence of signals locally decoded; 298 a scan converting buffer adapted to rearrange a sequence of decoded signals from the block scanning to the raster scanning.

At the side of the decoder, the vector quantization index 288 is decoded by the vector quantization decoder 292 and added to the predicted signal sequence read out of the frame memory 296 to provide the decoded image signal sequence. The decoded image signal sequence is rearranged by the scan converting buffer 298 from the order of block scanning to the order of raster scanning.

In this interframe encoding system, a correlation between the signals in the consecutive frames is obtained in accordance with interframe prediction. More specifically, a spatial correlation between the consecutive frames is applied to vector quantization by predicting the image signal of the present frame based on the signal decoded as the image signal of the frame immediately before the present frame whereby data compression is achieved. In this system, instead of utilizing the blocks located at the same positions of the consecutive frames, a movement compensation method wherein displacement (movement) is taken into consideration for attaining the maximum prediction efficiency or a random control method which does not encode all consecutive frames may be employed.

However, with regard to encoding and decoding according to the system as described above, time correlation between image signals is not fully utilized. Moreover, it is necessary to decode all the signals, starting from the first frame, and any undesired influence caused by an error such as noise may be propagated throughout decoding operation.

SUMMARY OF THE INVENTION

An object of the invention is to provide an encoding/decoding system capable of improving an encoding efficiency by utilizing local properties of input signals.

A further object of the invention is to provide a vector quantization encoding/decoding system capable of improving an encoding efficiency and shortening an average code length by utilizing local properties of input vectors.

Yet another object of the invention is to provide a vector quantization encoding/decoding system capable of improving an encoding efficiency by utilizing local properties of input vectors to allow block sizes to be variable.

A still further object of the invention is to provide an image signal encoding/decoding system capable of reducing an encoding error by utilizing a correlation in the direction of time.

In accordance with the objects above, there is provided an encoding/decoding system for sequentially encoding input digital signals and sequentially decoding the encoded digital signals, the encoding and decoding being performed on the basis of at least a time correlation between the respective input digital signals, thereby improving an encoding efficiency, comprising:

an encoding means for encoding input signals on the basis of local properties in the direction of time of the input signals; and a decoding means for decoding the encoded signals using the local properties in the direction of time.

In the first embodiment of the invention, an encoding/decoding system is provided for improving an encoding efficiency on the basis of a time correlation between input digital signals. In this system, an encoding means receives and encodes an input digital signal to output first encoded data. A first sequential list means receives and stores the first encoded data, outputs a list address in which the received first encoded data are stored and moves the stored encoded data to a predetermined location every time the encoding is performed, so as to update said first sequential list means. A variable length encoding means effects variable length encoding of the list address in accordance with variable length code allocation determined by a frequency in which the list address of the first encoded data is used, so as to send an encoded word. The encoded word from said variable length encoding means is received and decoded by a variable length decoding means to effect variable length decoding of the received encoded word so as to recover the list address. A second sequential list means outputs second encoded data in accordance with the list address sent from the variable length decoding means. A decoding means decodes the second encoded data and outputs a digital signal corresponding to the input signal.

The first and second sequential list means can store data in the same order. The first and second sequential list means can operate to move the just received data from the location of the just received data to a location ($\alpha \log_r N + \beta$) prior to that location, where $\alpha$ and $\beta$ are arbitrary constants and N is the number of data stored in each list means and r is an integer equal to or more than 2.

In the second embodiment of the invention, a vector quantization encoding/decoding system is provided for encoding a mean value, gain factor and output vector index of each input vector comprising K (K: a positive integer) input digital signals and decoding such encoded information to recover the input digital signals, the encoding and decoding being performed on the basis of a time correlation of the respective input vectors, thereby improving an encoding efficiency. In this embodiment, an encoding means encodes a mean value and gain factor of an input vector. A first sequential list means receives and stores the encoded mean value of the input vector, outputs a list address in which the received encoded mean value is stored and moves the stored encoded value to a predetermined first location every time the encoding is performed, so as to update the first list means. A second sequential list means receives and stores the encoded gain factor of the input vector, outputs a list address in which the received encoded gain factor is stored and moves the stored encoded gain factor to a predetermined second location every time the encoding is performed, so as to update the second list means. A third sequential list means receives and stores the encoded output vector index of the input vector, outputs a list address in which the received encoded vector index is stored and moves the stored coded vector index to a predetermined third location every time the encoding is performed, so as to update the third list means. A variable length encoding means effects variable length encoding of the list addresses from the first, second and third sequential list means to output encoded data. A variable length decoding means decodes the encoded data to recover encoded data corresponding to the list addresses of the mean value, gain factor and output vector index. A decoding means decodes the recovered encoded data to obtain data corresponding to the input signal.

A mean value separating means may be provided for receiving the input vector to supply to the encoding means the mean value of the input vector and a vector resulted from the separation of the mean value from the input vector. A vector quantization encoding means may be provided for calculating an inner product of the mean-value-separated vector and a normalized output vector, and a maximum inner product detecting means detects the maximum inner product out of the inner products so as to supply the maximum inner product to the encoding means.

The first, second and third predetermined location may be the top locations of the corresponding sequential list means.

In the third embodiment, a vector quantization encoding/decoding system for improving an encoding efficiency on the basis of time and space correlations between input vectors is provided. In this embodiment, a block control means receives a predetermined number of input signals and outputs an input vector comprising the input signals and first property data indicative of properties of the input vector. A first code book means prestores a plurality of representative quantization vectors. A second code book means stores a plurality of vectors comprising input signals which are adjacent to the input signals forming the input vector. A third code book means stores a unique block comprising an area including the input vector. A vector quantization encoding means effects vector quantization encoding of the input vector on the basis of an output from the block control means and any one of outputs of the first, second and third code book means, and outputs a representative quantization vector and second property data indicative of properties of the representative quantization vector if the minimum distortion at the time of vector quantization is larger than a predetermined value. A first memory means stores the representative quantization vector in a predetermined address as a decoding vector. A second memory means stores the unique block in a predetermined address if the minimum distortion at the time of vector quantization is larger than a predetermined value in the vector quantization encoding means. A code book control means causes the contents of the first and second memory means to be transferred to the second and third code book means, respectively, every time a new representative quantization vector is output from the vector quantization encoding means. An encoder means encodes either of the second property data or a combination of the second property data and the unique block in accordance with the second property data and outputs encoded data. A decoder means receives and decodes the encoded data from the encoder means to recover either of the second property data or the combination of the unique block and the second property data in accordance with the recovered second property data. A vector quantization decoding means effects the vector quantization decoding of the recovered information from the decoder means and recovers the representative quantization vector.

The vector quantization decoding means may include another set of three code book means, the contents of which are similar to the first, second and third code book means, respectively, and a second code book control means for controlling this set of three code book means in a manner similar to the first code book control means.

The input signals can be a part of picture signals in a frame, the first property data may comprise a block size of the input vector and an address of the input vector in the frame, and the second property data may comprise at least a code book number indicating which one of the first, second and third code book means has been used when the vector quantization encoding is performed.

In the fourth embodiment of the invention, a vector quantization encoding/decoding system is provided for a sequence of image signals. In this embodiment, a first memory means receives and stores a sequence of image signals having a length of a plurality number L of frames. A vector quantization encoding means receives a block comprising K×L signals read out of the first memory means and effecting vector quantization encoding of the block as an input vector. Those K signals occupy the same area in each of L frames. A quantization index corresponding to the input vector is transmitted from the vector quantization encoding means. A vector quantization decoding means receives and effects the vector quantization decoding of the quantization index and outputs K×L image signals. A second memory means stores the decoded K×L signals such that the K signals occupy the same area in each of L frames. The first and second memory means can be L frame memories.

BRIEF DESCRIPTION OF THE DRAWINGS

The above and other objects and features of the invention will become more obvious hereinafter from a consideration of the following description taken in connection with the accompanying drawings, wherein:

FIGS. 12(a), 12(b) and 12(c) are used for explaining how sequential lists shown in FIGS. 10 and 11 are updated;

DESCRIPTION OF THE PREFERRED EMBODIMENTS

Figure 1:
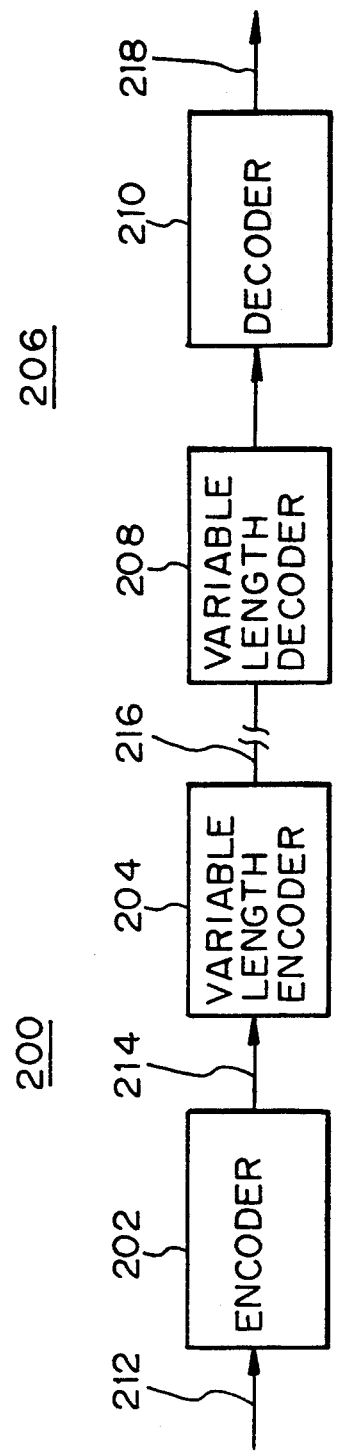
FIG. 1 is a block diagram of an encoding/decoding system of the prior art.
Figure 2:
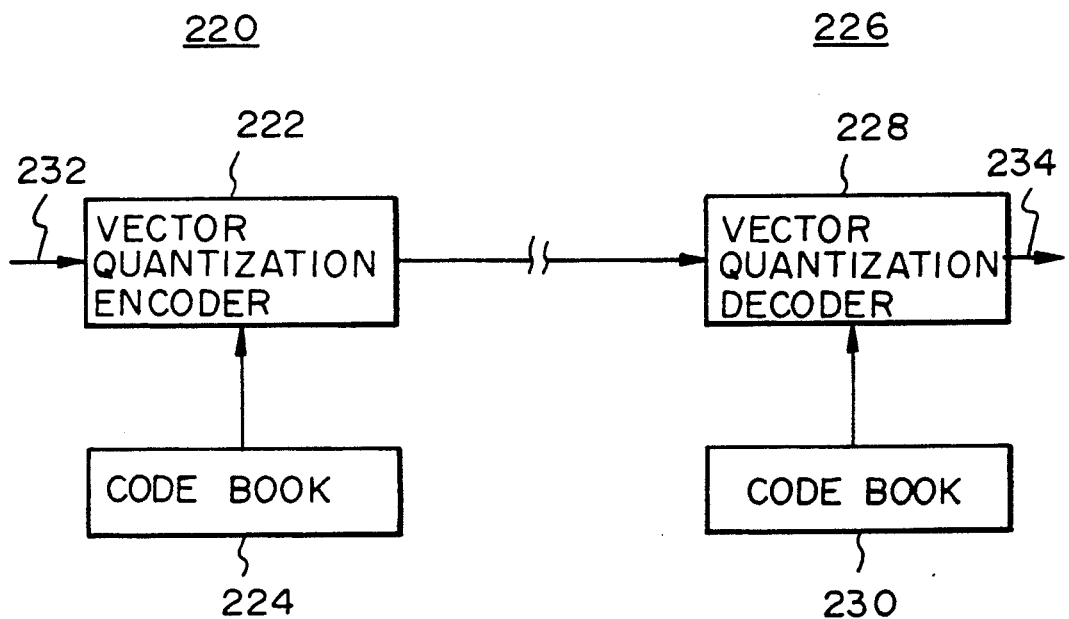
FIG. 2 is a block diagram of a vector quantization encoding/decoding system of the prior art.
Figure 8:
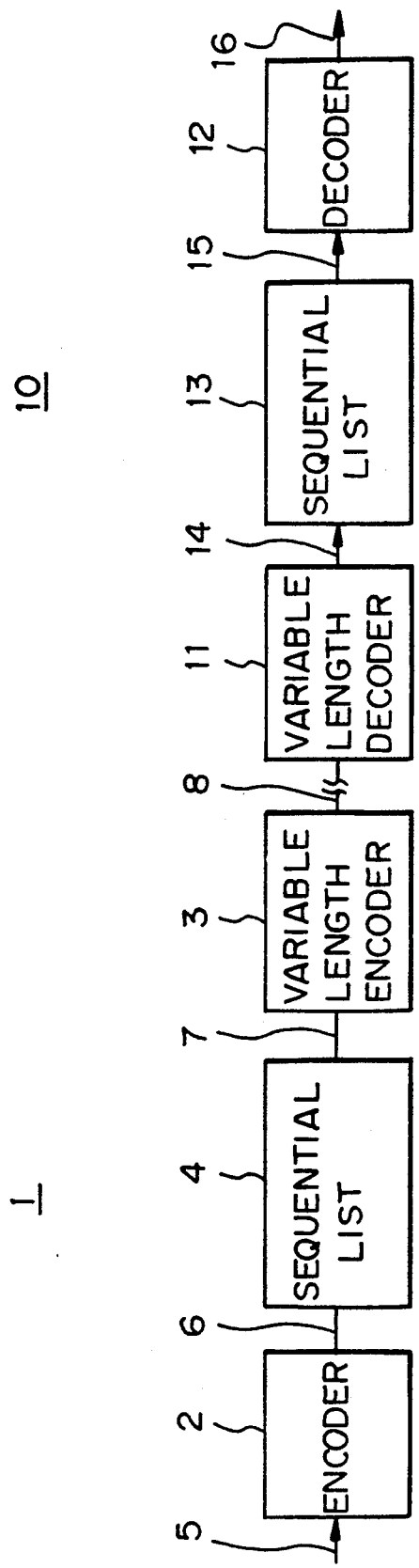
FIG. 8 is a block diagram of the first embodiment of an encoding/decoding system according to the present invention.

FIG. 8 is a block diagram schematically illustrating the constitution of the first embodiment of the encoding/decoding system according to the present invention. In FIG. 8, an encoding section 1 comprises an encoder 2 similar to the encoder 202 in FIG. 1, a variable length encoder 3 and a first sequential list 4 connected between the encoders 2, 3 and adapted to store encoded data. The decoding section 10 comprises a variable length decoder 11, a decoder 12 and a second sequential list 13.

An operation of this system will next be explained.

A signal 5 input to the encoding section 1 is encoded to encoded data 6 with a high efficiency by the encoder 2 in the same manner as the prior art. Then the first sequential list 4 receives and stores the encoded data from the encoder 2 and list address 7 in which the received encoded data 6 is stored is output. The list address read out of the first sequential list 4 is subjected to variable length encoding at the variable length encoder 3 and transmitted as a code word 8 to the variable length decoder 11.

In the decoding section 10, the code word 8 is subjected to variable length decoding by the variable length decoder 11 and a list address 14 is obtained. The list address 14 is input to the second sequential list 13. Then data 15 is taken out of the second sequential list in response to the input list address 14 and decoded by the decoder 12 to be provided as an output signal 16 corresponding to the signal 5.

It is to be noted that the first and second sequential lists 4 and 13 operate to store the sequentially received encoded data in the same order.

Figure 9A:
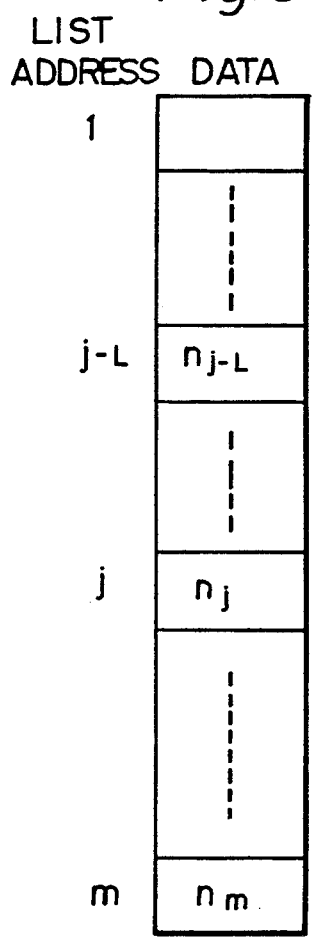
FIGS. 9(a), 9(b) and 9(c) are used for explaining how sequential lists shown in FIG. 8 are updated.
Figure 9B:
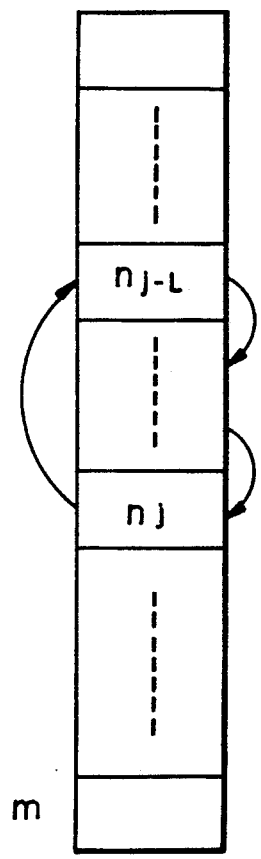
Figure 9C:
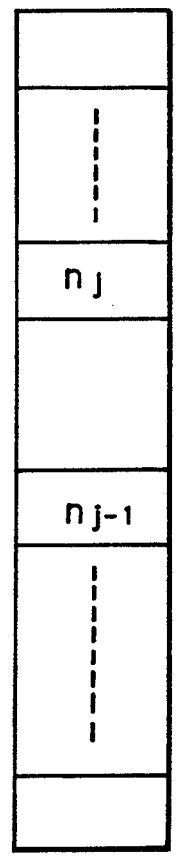

Every time the encoding is executed by the encoder 2, the encoded data is stored at the address 7 in the first sequential list 4 and then moved on the list, as shown in FIG. 9, to a location L ($=\alpha\log_r N + \beta$) locations prior to the present location ($\alpha$, $\beta$: arbitrary constant, N: the number of the encoded data stored in the list 4, r: integer equal to and more than 2). The second sequential list 13 stores and moves the received data in the same manner as the first sequential list 4 every time the decoding is executed. Such operations are performed simultaneously at the encoding section 1 and the decoding section 10, and the lists 4, 13 are thus updated.

The variable length encoder 3 performs variable length encoding on the basis of how frequently list addresses in the first sequential list 4 are used such that a shorter code word is allocated to more frequently used list address and that a longer code word is allocated to a less frequently used list address.

As explained above, according to this embodiment of the present invention, variable length code allocation may be executed by utilizing such local properties as time correlation between the adjacent signals by which the same values are continuously input, whereby an average code length can be shortened and an encoding efficiency can be improved.

Utilization of a time correlation between signal sequences is also effective in shortening a code length in a vector quantization encoding/decoding system. A vector quantization encoding/decoding system, the second embodiment of an encoding/decoding system according to the present invention, will now be explained with reference to FIG. 10 through FIG. 12.

Figure 3:
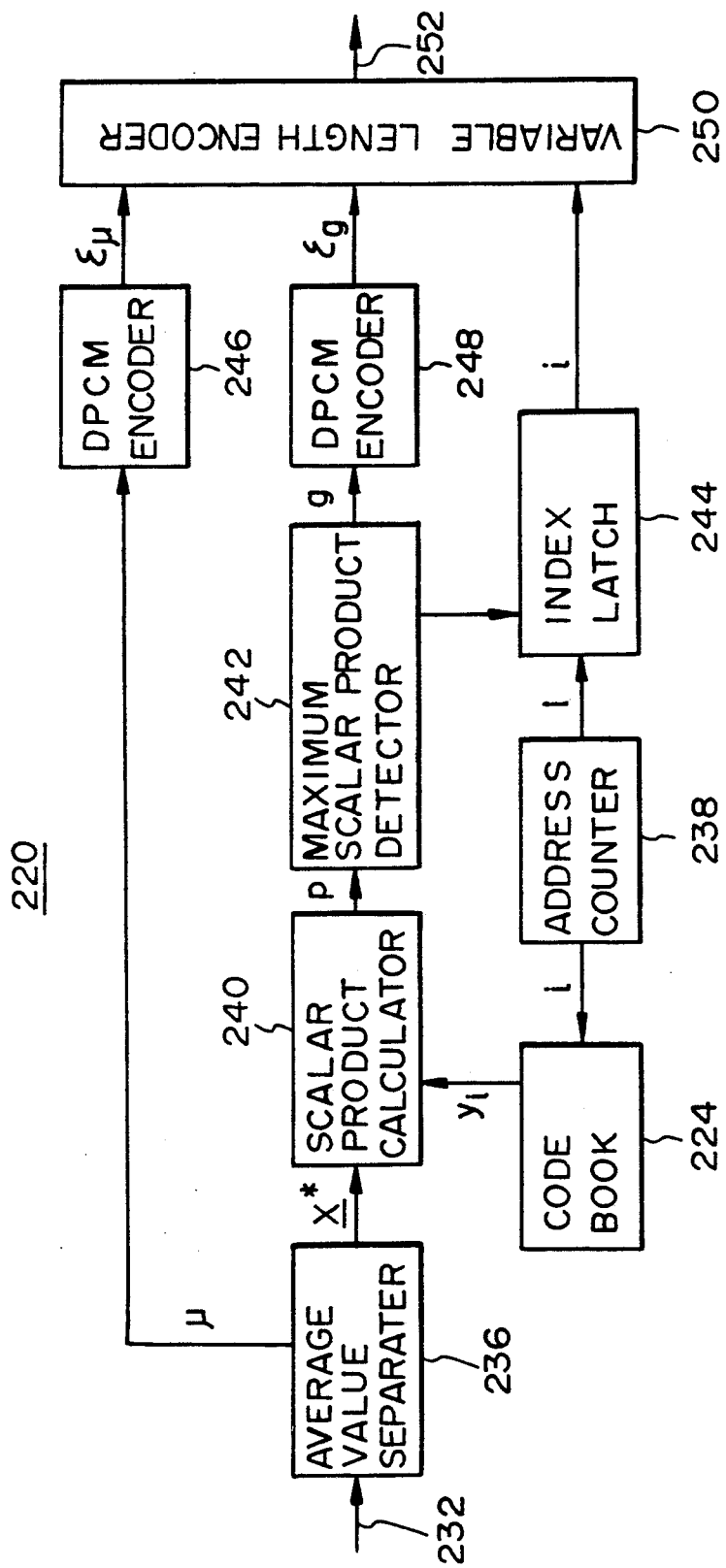
FIG. 3 is a circuit diagram of a vector quantization encoding section shown in FIG. 2.
Figure 4:
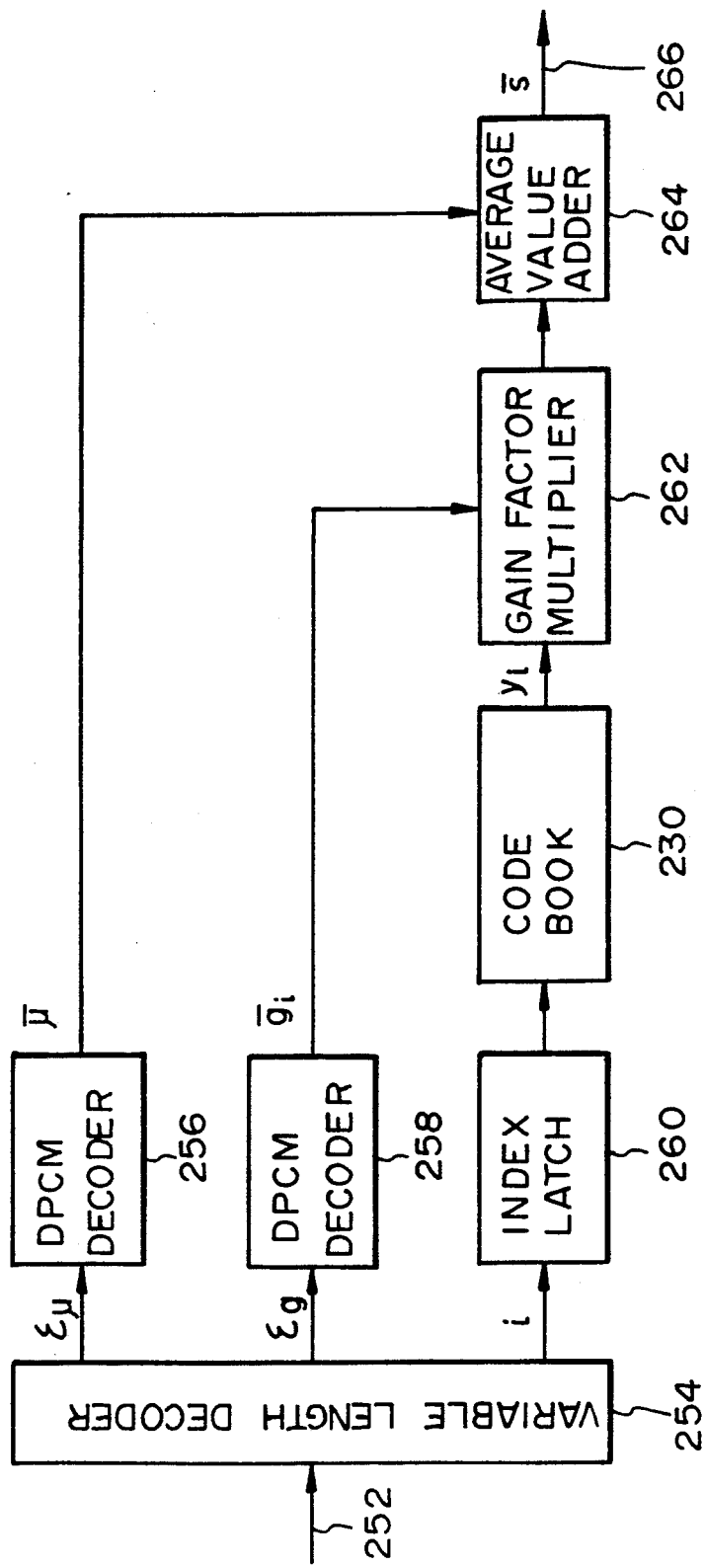
FIG. 4 is a circuit diagram of a vector quantization decoding section shown in FIG. 2.
Figure 5:
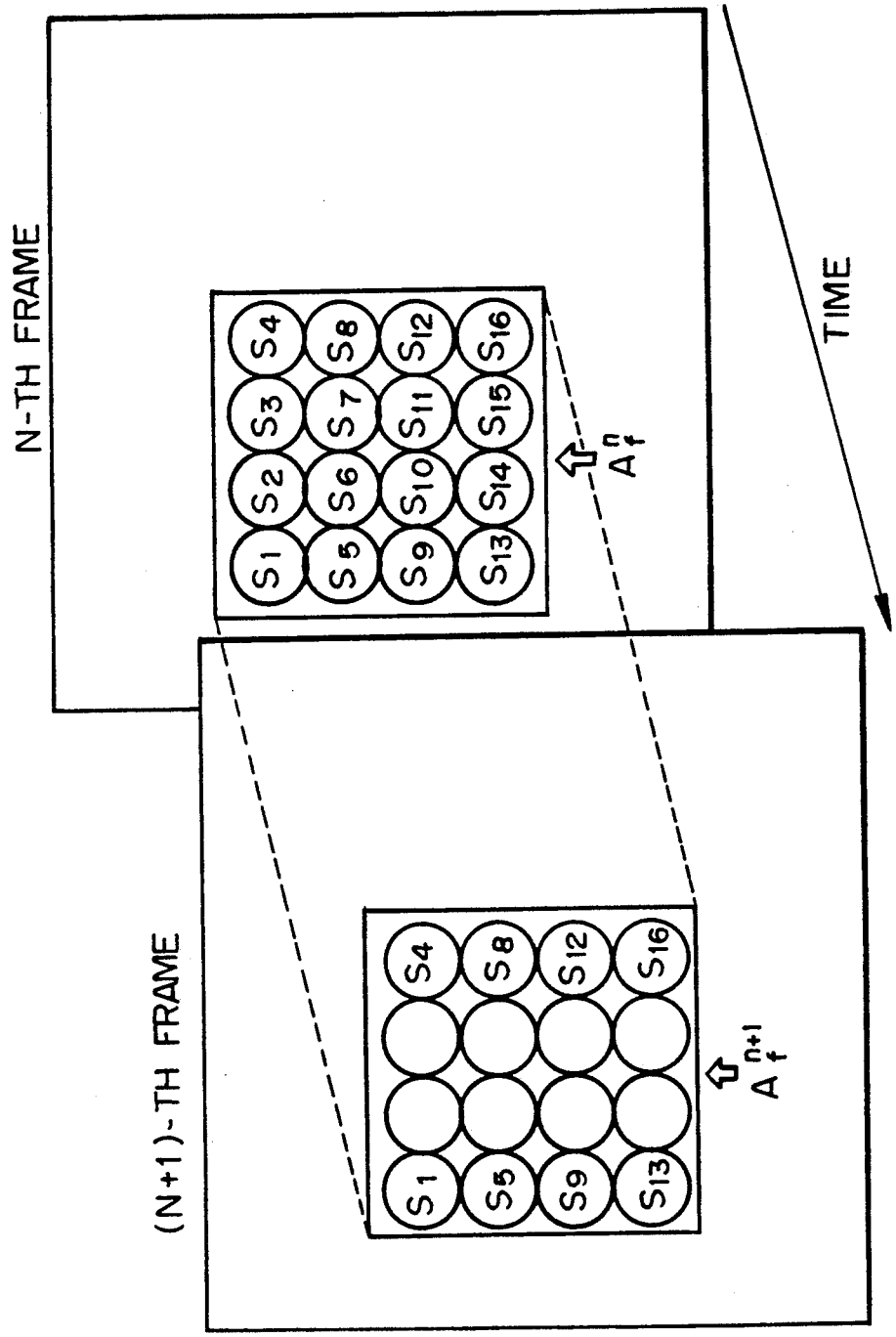
FIG. 5 is used to explain an interframe encoding system of the prior art.
Figure 6:
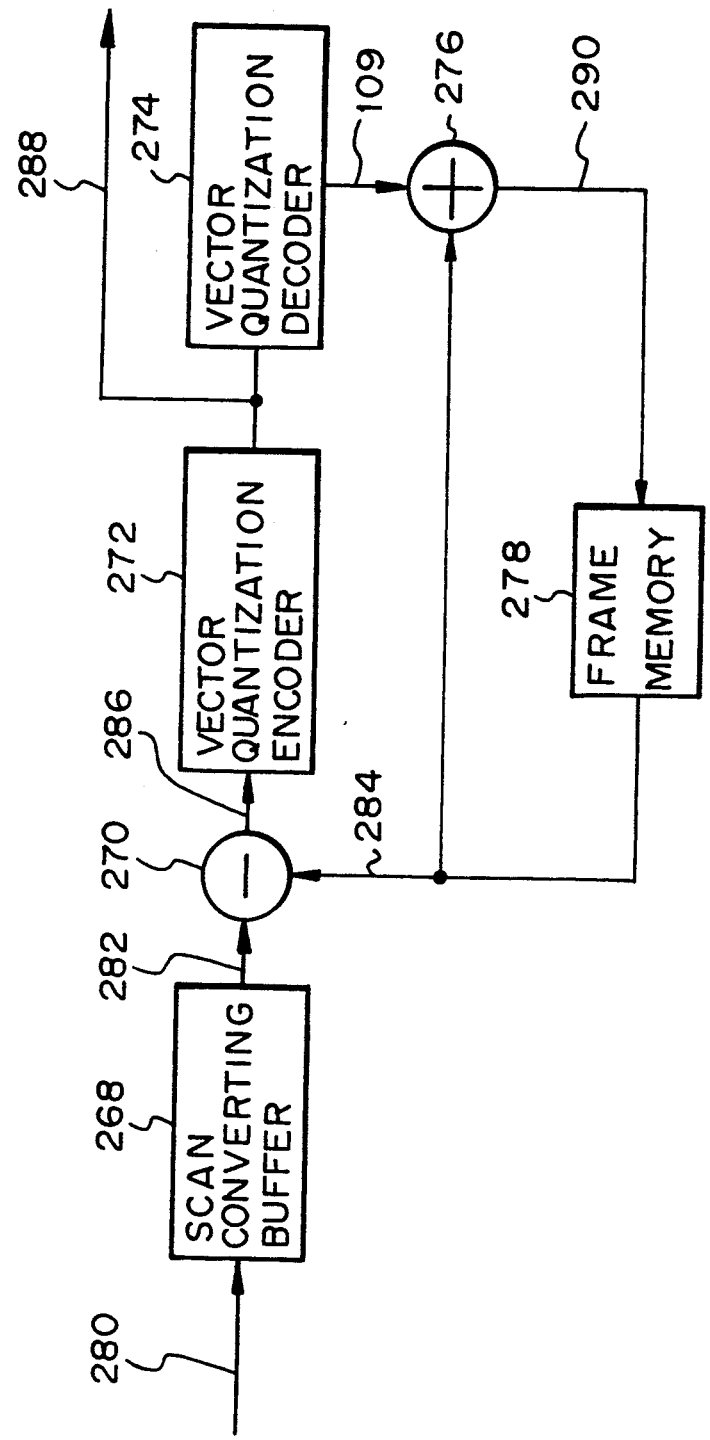
FIG. 6 is a block diagram of an encoder used in the interframe encoding system explained in connection with FIG. 5.
Figure 7:
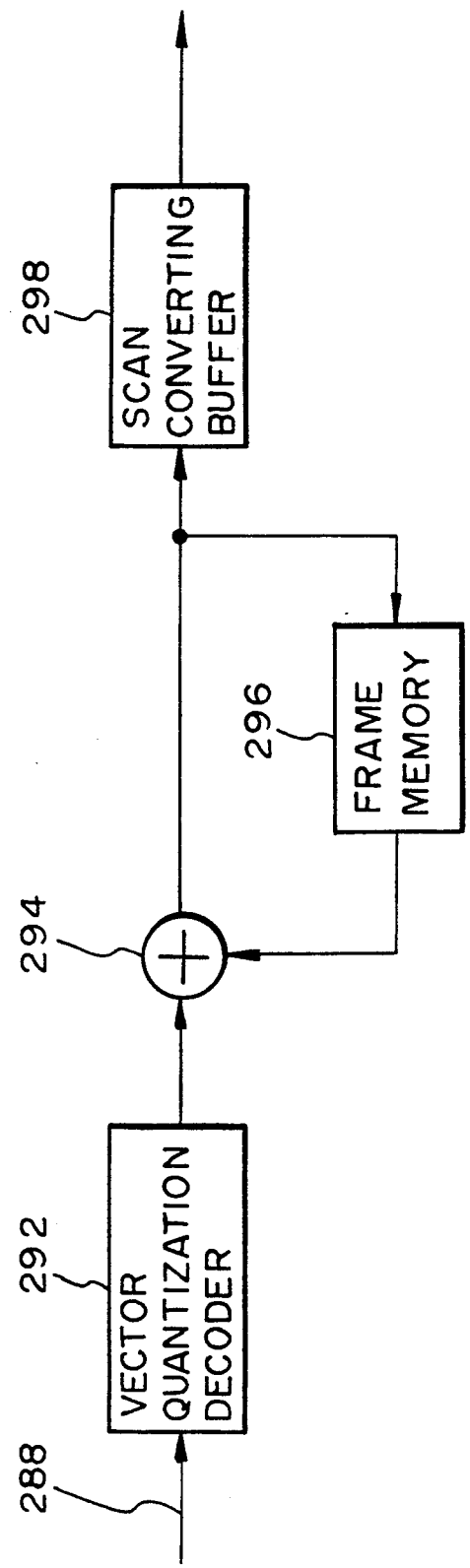
FIG. 7 is a block diagram of a decoder for recovering signals sent from the encoder shown in FIG. 6.
Figure 10:
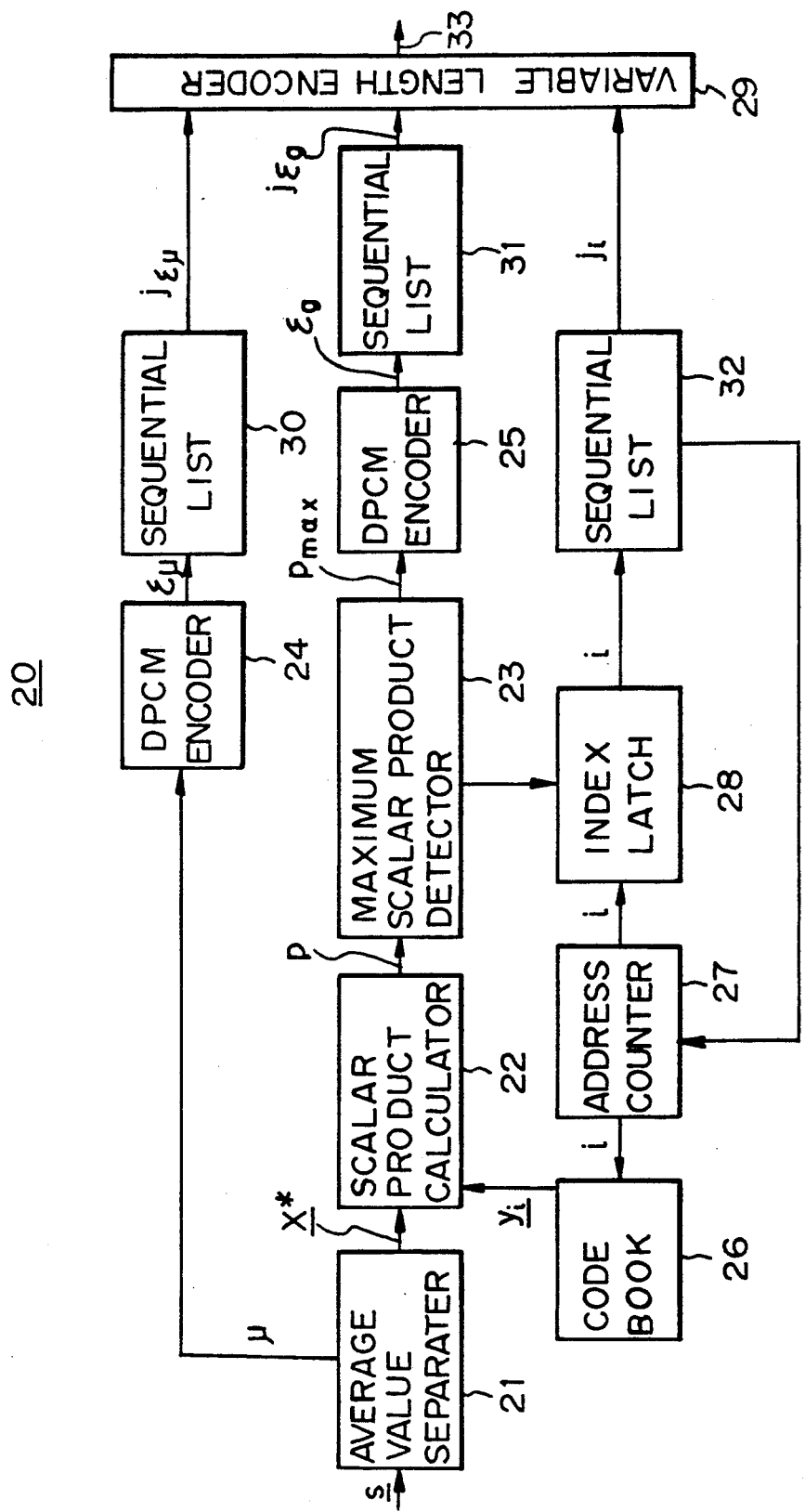
FIGS. 10 and 11 are block diagrams of an encoding section and a decoding section, respectively, of the second embodiment of an encoding/decoding system according to the present invention.
Figure 11:
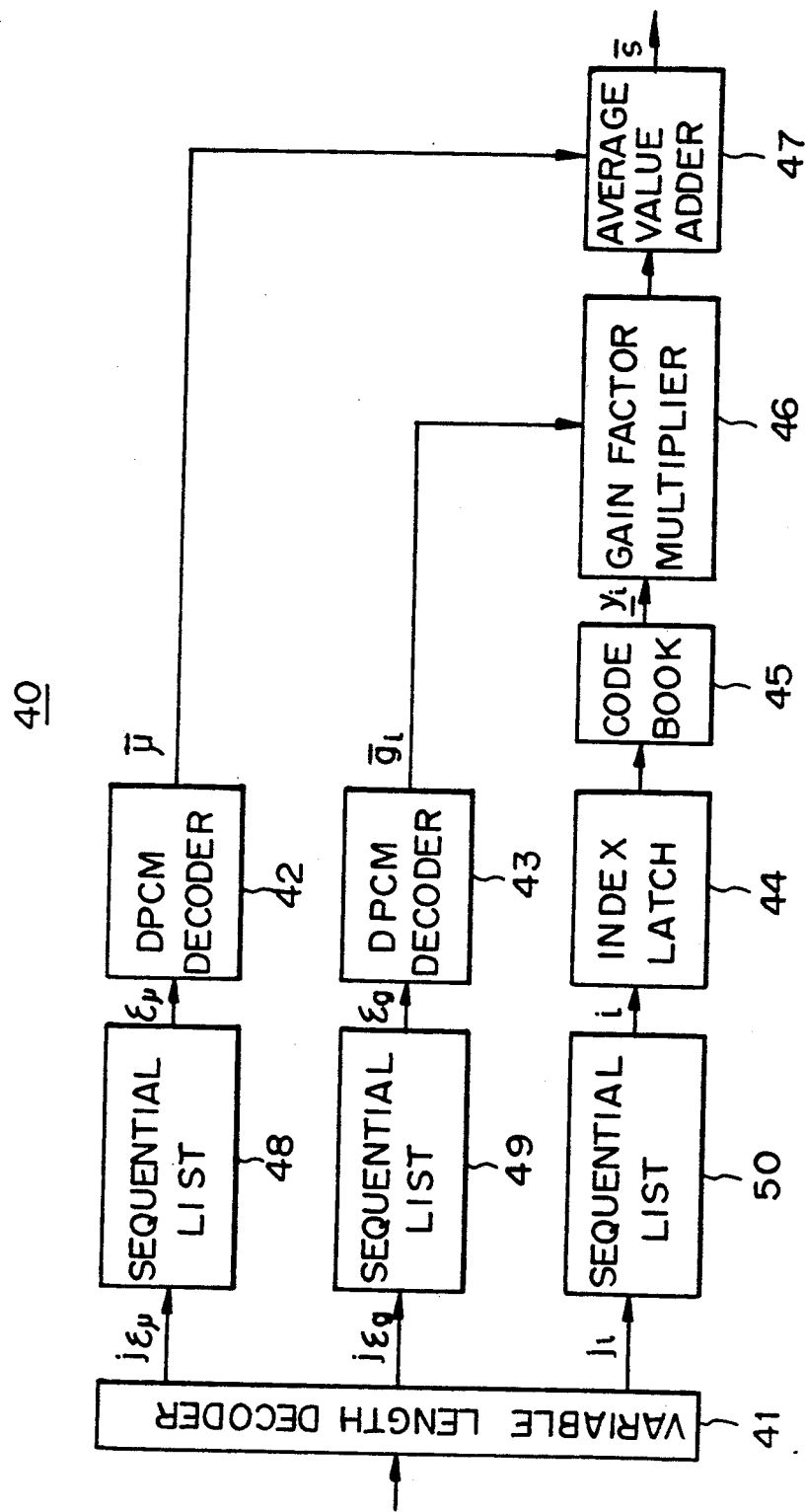

FIG. 10 is a block diagram schematically illustrating the constitution of a vector quantization encoding section 20 of the second embodiment of the present invention, and FIG. 11 is a block diagram schematically illustrating a vector quantization decoding section 40 of the second embodiment of the present invention. In FIG. 10, a mean value separation circuit 21, an inner product calculating circuit 22, a maximum inner product detection circuit 23, DPCM encoding circuits 24, 25, a code book 26, an address counter 27, an index latch 28 and a variable length encoding circuit 29 of the encoding section 20 respectively perform the same functions as the mean value separation circuit 236, the inner product calculating circuit 240, the maximum inner product detection circuit 242, the DPCM encoding circuits 246, 248, the code book 224, the address counter 238, the index latch 244 and the variable length encoding circuit 250 of the encoding section 220 shown in FIG. 3. A variable length decoding circuit 41, a DPCM decoding circuits 42, 43, an index latch 44, a code book 45, a gain factor multiplyer 46 and a mean value adder 47 of the decoding section 40 in FIG. 11 respectively perform the same functions as the variable length decoding circuit 254, the DPCM decoding circuits 256, 258, the index latch 260, the code book 230, the gain factor multiplier 262 and the mean value adder 264 of the decoding section 226 in FIG. 4. Accordingly, in order to avoid repetition of the same explanation these circuits will not be explained again.

According to the second embodiment of the present invention, between the variable length encoding circuit 29 and the DPCM encoding circuits 24, 25, between the variable length encoding circuit 29 and the index latch 28, between the variable length decoding circuit 41 and the DPCM decoding circuits 42, 43 and between the variable length decoding circuit 41 and the index latch 44, sequential lists 30, 48 for mean values, sequential lists 31, 49 for gains and sequential lists 32, 50 for normalization output vector indexes are respectively provided.

An operation of the system according to second embodiment will next be explained.

A mean value $\mu$ is separated from a signal sequence input as a K-dimensional input vector $S = [S_1, S_2, \ldots, S_K]$ by the mean value separation circuit 21, and the mean-value-separated input vector is converted to the vector $X^*$. Those $\mu$ and $X^*$ are expressed as follows:

$$\mu = (1/K) \sum_{l=1}^{K} S_l$$

$$X^*_l = S_l - \mu$$
$$X^* = [X^*_1, X^*_2, \ldots, X^*_K]$$

The mean value $\mu$ is DPCM-ed and redundancy is removed from the mean value $\mu$ by the DPCM encoding circuit 24, and a redundancy-removed DPCM-ed mean value is output as a DPCM signal $\epsilon_\mu$ to the sequential list 30 and stored therein. From the sequential list 30, a list address $j_{\epsilon\mu}$ at which the DPCM signal $\epsilon_\mu$ has been stored is output. The mean-value-separated vector $X^*$ is subjected to the vector quantization encoding in the following manner by the inner product calculating circuit 22. Firstly, in the same manner as the conventional method, a set of a plurality of normalized output vectors $y_i$ ($i = 1, 2, \ldots, N$) has been written in the code book 26. As described before, $$\sigma = \left[ \sum_{l=1}^{K} (X^*_l)^2 \right]^{\frac{1}{2}}$$

$$X_l = X^*_l/\sigma = (S_l - \mu)/\sigma$$
$$X = [X_1, X_2, \ldots, X_K]$$

At the time when the mean-value-separated vector $X^*$ is input to the inner product calculating circuit 22, the address counter 27 outputs address information i to the code book 26 which, in turn, outputs a normalized output vector $y_i$ corresponding to the address information i. Then the inner products of the mean-value-separated vector $X^*$ and N normalized output vectors $y_i$ serially read out of the code book 26 are calculated by the inner product calculating circuit 22 in accordance with the following equation and compared successively with each other.

$$P(X^*, y_i) = \sum_{l=1}^{K} (X^*_l \cdot y_{il})$$

The maximum inner product detection circuit 23 detects the maximum inner product $P_{max}$ out of N inner products obtained by the above-described operation and the address information i at the time when $P_{max}$ is detected is taken into the index latch 28 which, in turn, outputs a normalized output vector index i. The index i is received and stored by the sequential list 32, and a list address $j_i$ at which the normalized output vector index i has been stored is output from the sequential list 32. The maximum inner product $P_{max}$ thus detected is input directly to the DPCM encoding circuit 25 as a gain. After removing any redundancy from $P_{max}$, the DPCM encoding circuit 25 outputs the DPCM signal $\epsilon_g$ which, in turn, is received and stored by the sequential list 31. A list address $j_{\epsilon g}$ at which the DPCM signal $\epsilon_g$ has been stored is output by the sequential list 31. Then, the list address $j_{\epsilon\mu}$ of the DPCM signal $\epsilon_\mu$ of the mean value, the list address $j_{\epsilon g}$ of the DPCM signal $\epsilon_g$ of the gain and the list address $j_i$ of the normalized output vector index are all subjected to variable length encoding at the variable length encoding circuit 29 and transmitted as encoded data 33.

An operation of the vector quantization decoding section 40 will next be explained. The list address $j_{\epsilon\mu}$ of the DPCM signal of the mean value, the list address $j_{\epsilon g}$ of the DPCM signal of the gain and the list address $j_i$ of the normalized output vector index are decoded by the variable length decoding circuit 41 form the encoded data 33 transmitted from the encoding section 20. Then, the DPCM signal $\epsilon_\mu$ of the mean value is read out from the sequential list 48 and a mean value $\overline{\mu}$ is decoded and reproduced by the DPCM decoding circuit 42.

The DPCM signal $\epsilon_g$ of the gain is read out from the sequential list 49 and a gain $\overline{g}_i$ is decoded and reproduced by the DPCM decoding circuit 43.

The normalized output vector index i is read out from the sequential list 50 and taken in the index latch 44, which causes, in the same manner as the prior art, the normalized output vector $y_i$ corresponding to the normalized output vector index i to be read out and decoded by the coded book 45 which stores the same content as the code book 26. The normalized output vector $y_i$ is multiplied with the decoded gain $\overline{g}_i$ by the gain factor multiplier 46 and the result of the multiplication is added to the decoded mean value $\overline{\mu}$ by the mean value adder 47, whereby a decoded and reproduced vector $\overline{S}$ can be obtained. In other words, the following operations are carried out:

$$\overline{S_j} = \overline{g_f} y_{ij} + \overline{\mu}$$

$$\overline{S} = [S_1, S_2, \ldots, S_K]$$

The sequential lists 30, 48 for mean values, the sequential lists 31, 49 for gains and the sequential lists 32, 50 for normalized output vector index respectively store data in the same order. Every time such a signal transmission as described above is made, the transmitted contents are brought to the top of the lists simultaneously in the sequential lists in the encoding section 20 and the decoding section 40 in the manner as shown in FIG. 12, so that the sequential lists are updated.

At the initial state, the DPCM signal values for the mean values are stored in the sequential lists 40, 48 from the top thereof in the order of 0, −1, 2, −2, 3, −3, . . . . In the sequential lists 31, 49, the DPCM signal values for the gains are stored in the order of 0, 1, −1, 2, −2, 3, −3, . . . from the top of these lists. The normalized output vector index values are stored in the sequential lists 32, 50 in the order of 1, 2, . . . , N from the top of these lists.

According to the second embodiment of the present invention, local inclinations by which the same values are successively selected due to a correlation between adjacent vectors are taken into consideration, so that the sequential lists for the mean value, the gain and the normalized output vector index are updated. Since the values which have been previously used are entered at the top list address of these sequential lists, a list address nearer to the top of the sequential list is more frequently used, whereby an average code length at the time of variable length code allocation can be shortened and an encoding efficiency may be improved.

FIG. 13 through FIG. 16 illustrate a vector quantization encoding/decoding system as the third embodiment of an encoding/decoding system according to the present invention wherein such local inclinations of input vectors as a correlation in respect of space and time between adjacent input vectors are considered.

Figure 13:
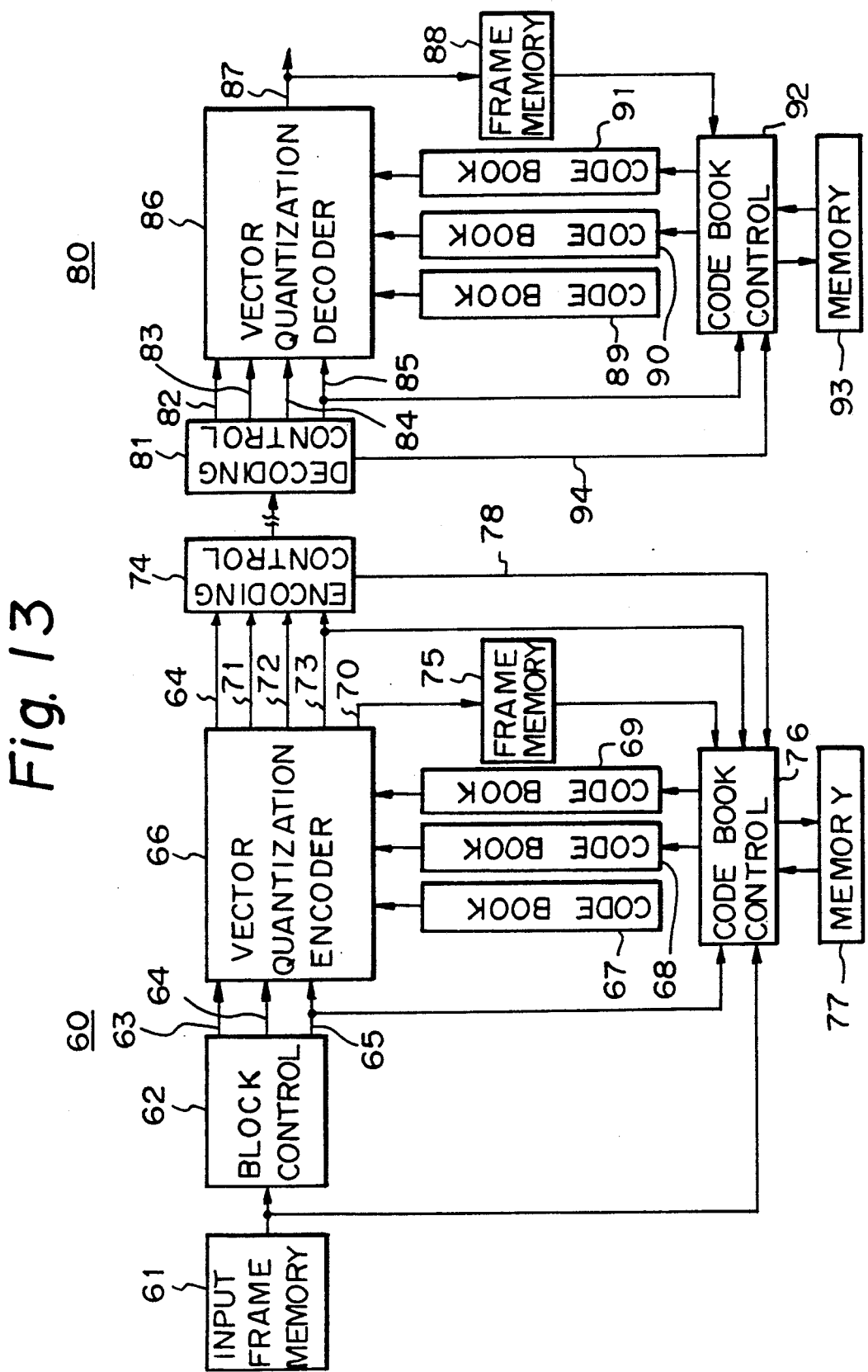
FIG. 13 is a block diagram of the third embodiment of an encoding/decoding system according to the present invention.
Figure 14:
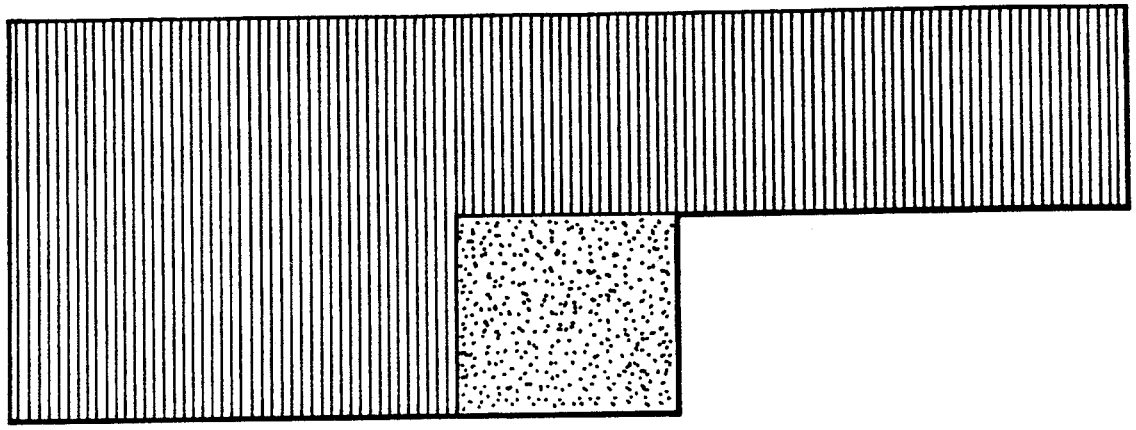
FIG. 14 is used for explaining how the second code book shown in FIG. 13 is produced.
Figure 15:
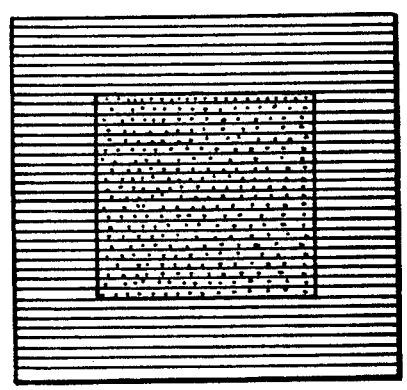
FIG. 15 is used for explaining how the third code book shown in FIG. 13 is produced.

FIG. 13 is a block diagram showing an encoding section 60 and a decoding section 80 of a vector quantization system according to the third embodiment. In FIG. 13, an input frame memory 61 is adapted to store input image signals of one frame. The image signals from the input frame memory 61 are sequentially grouped into blocks by a block control unit 62 to provide input vectors 63. The block control unit 62 is further adapted, depending on the dispersion of the components of each input vector 63, to transmit processing block size information 64 and an address 65 of the input vector 63 on the frame. A vector quantization encoder 66 operates to execute vector quantization encoding of the input vector 63 from the block control unit 62 by using the first to the third code books 67–69, and, when a distortion at the time of the vector quantization is larger than a predetermined value, outputs the input vector 63 as a representative quantization vector 76 as well as the block size information 64, a code book number 71, an address 72 and an index 73.

The first code book 67 prestores a plurality of representative quantization vectors. The second and the third code books 68, 69 will be explained later.

An encoding control unit 74 receives the block size information 64, the code book number 71, the address 72 and the index 73 and encodes a unique block (to be explained later) when the minimum distortion is larger than a predetermined value and transmits the encoded unique block as encoded data.

The representative quantization vector 70 from the vector quantization encoder 66 is input in a frame memory 75 and stored in a predetermined address as a decoding vector.

A code book control unit 76 is adapted to generate the second code book 68 on the basis of a quantized area near the input vector 63 by using the input image signals of one frame from the frame memory 61, the address 65 of the input vector 63 on the frame and the decoding vector from the frame memory 75. Also the unit 76 generates the third code book 69 on the basis of the unique blocks in a memory 77 and causes the unique blocks to be stored in the memory 77 under the control of a code book control signal 78. More specifically, the second code book 68 comprises a plurality of vectors collected from a quantized area (designated by vertical lines in FIG. 14) adjacent to the input vector in the same dimension as the processing block size of the input vector with such area being allowed to partly superimpose the input vector 63. The third code book 69 comprises a plurality of vectors or the unique blocks (designated by the horizontal lines in FIG. 15) collected from an area including the input vector in the same dimension as the processing block size of the input vector when the minimum distortion exceeds a preset distortion threshold when the first and second code books 67, 68 are used.

The encoded data transmitted from the encoding control unit 74 are decoded by a decoding control unit 81 to a block size information 82, a code book number 83, an address 84 and an index 85 corresponding to the block size information 64, the code book number 71, the address 72 and the index 73, respectively. A vector quantization decoder 86 executes vector quantization decoding by utilizing the decoded block size information 82, the code book number 83, the address 84 and the index 85, whereby a decoded vector 87 may be reproduced. The decoded vector 87 is also provided to a frame memory 88 and stored in a predetermined address.

Three code books 89–91 storing the information in the same manner as the first through third code books 67–69 for the encoder 60 are connected to the vector quantization decoder 86. The contents stored in these code books 89–91 are controlled by the code book control unit 92 in the same manner as the code book control unit 76 in the encoding section 60. To the code book control unit 92, is connected a memory 93 adapted to store unique blocks in the same manner as the memory 77.

Figure 16:
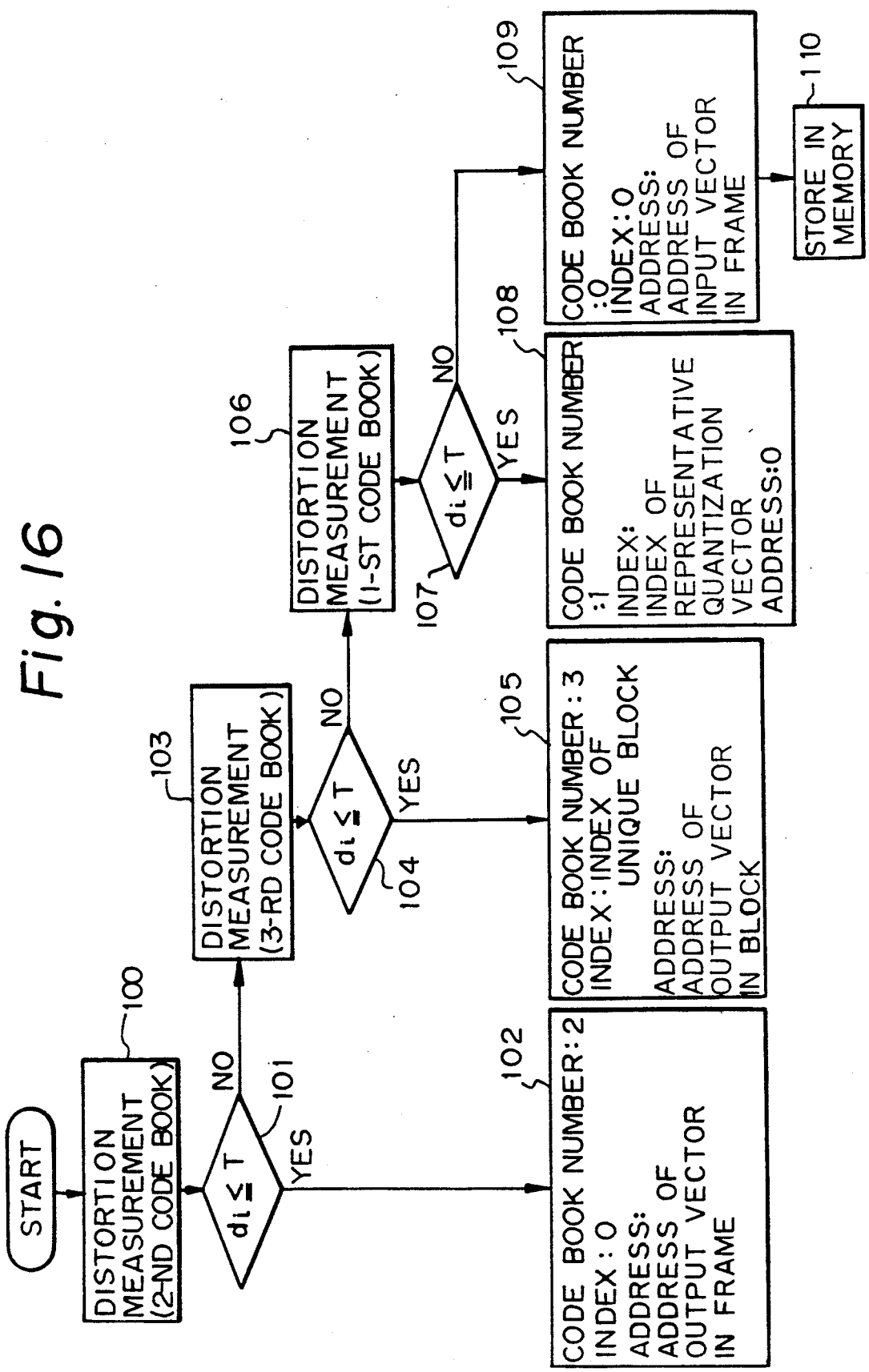
FIG. 16 is a flowchart for explaining an operation of the encoding/decoding system shown in FIG. 13.

An operation of the system as described above will next be explained in accordance with a flowchart shown in FIG. 16.

At the block control unit 62, a plurality of image signals read out of the frame memory 61 storing the input image signals for one frame are grouped in a block and the input vector X 63 is generated. The input vector is supplied to the vector quantization encoder 66 together with the address 65 of the input vector on the input frame memory 61 and the block size information 64 determined at the time of vector quantization by the dispersion of the vector components. At the vector quantization encoder 66, a distortion calculation is made at a block 100 (FIG. 16) by using the second code book 68 on the basis of a processing size depending on the block size information 64 and the representative quantization vector $Y_i$ 70 which provides the minimum distortion $d_i$ is obtained. Next at a block 101, a comparison is made between the minimum distortion $d_i$ and a distortion threshold T optionally established. When $d_i \leq T$ and the second code book 68 is used, at a block 102, "2" as the code book number 71, "0" as the index 73 and the address on the frame of the representative quantization vector which provides the minimum distortion as the address 72 are output together with the respective quantization vector 70.

In contrast, when the second code book 68 is used and $d_i > T$, the calculation of distortion is made at a block 103 by using the third code book 69 to obtain the vector $Y_i$ which becomes the representative quantization vector 70 providing the minimum distortion $d_i$ and a comparison is made at a block 104 between the minimum distortion $d_i$ and the distortion threshold T.

When the third code book 69 is used and $d_i \leq T$, at a block 105, "3" as the code book number 71, the index i of the unique block as the index 73 and the address of the representative quantization vector 70 on the unique block which provides the minimum distortion $d_i$ as the address 72 are output together with the representative quantization vector 70.

In contrast, when the third code book 69 is used and $d_i > T$, at a block 106, the calculation of distortion is made by using the first code book 67 to obtain the vector $Y_i$ which becomes the representative quantization vector 70 providing the minimum distortion $d_i$. Next, at a block 107, a comparison is made between the minimum distortion $d_i$ and the distortion threshold T.

When the first code book 67 is used and $d_i \leq T$, at a block 108, "1" as the code book number 71, the index of the representative quantization vector 70 providing the minimum distortion as the index 73 and "0" as the address 72 are output together with the representative quantization vector 70.

On the other hand, when the first code book 67 is used and $d_i > T$, at a block 109, "0" as the code book number 71, "0" as the index 73 and the address of the input vector on the frame as the address 73 are output together with the representative quantization vector 70. Such information is stored in the memory 77 at a block 110.

At the starting point of encoding, since the second code book 68 and the third code book 69 have been cleared, such a distortion calculation is carried out by utilizing the first code book 67.

At the encoding control unit 74, the following process is executed in accordance with the values of the code book number 71, the address 72 and the index 73.

When the code book number 71 is "1", this code book number 71, the index 73 and the block size information 64 are transmitted as the encoded data and "0" is output as the code book control signal 78.

When the code book number 71 is "2", this code book number 71, the address 72 and the block size information 64 are transmitted as the encoded data and "0" is output as the code book control signal 78.

When the code book number 71 is "3", this code book number 71, the address 72, and the block size information 64 are transmitted as the encoded data and "0" is output as the code book control signal 78.

Further, when the code book number 71 is "0", this code book number 71, the unique block and the block size information 64 are transmitted as the encoded data and "1" is output as the code book control signal 78.

At the code book control unit 76, the following process is executed in accordance with the code book control signal output from the encoding control unit 74.

When the code book control signal 78 assumes "0", the representative quantization vector 70 is written in a predetermined address in the frame memory 75.

On the other hand, when the code book control signal 78 assumes "1", the representative quantization vector 70 is written in a predetermined address in the frame memory 75 and an area including the input vector (designated by the horizontal lines in FIG. 15) is written in a specified address in the memory 77 as the unique block. When the unique blocks are written, the writing address are so controlled as to recycle from the address "zero" to the maximum address in order to prevent overflow.

The decoding control unit 81 adapted to receive the encoded data from the encoding control unit 74 executes the following processes in accordance with the values of the code book number 83 obtained by decoding the encoded data.

Firstly, when the code book number 83 is "1", this value "1" of the code book number 83 and the index 85 are transmitted and "0" is output as the code book control signal 94.

When the code book number 83 is "2", this value "2" of the code book number 83 and the address 84 are transmitted and "0" is output as the code book control signal 94.

When the code book number 83 is "3", this value "3" of the code book number 83 and the address 84 are transmitted and "0" is output as the code book control signal 94.

When the code book number 83 is "0", this value "0" of the code book number 83 and the unique block are transmitted and "1" is output as the code book control signal 94.

The code book control unit 92 controls to allow the unique block which is an area including the input vector (designated by the horizontal lines in FIG. 16) to be written in a predetermined address when the code book control signal 94 output from the decoding control unit 81 assumes "1". It is also noted that the writing addresses are so controlled as to recycle from the address "zero" to the maximum address in order to prevent overflow when such unique blocks are written.

The vector quantization decoder 86 executes the following processes in accordance with the values of the code book number 83, the address 84 and the index 85.

When the code book number 83 is "1", the representative quantization vector of the first code book 89 corresponding to the index i is reproduced as the decoded vector 87.

On the other hand, when the code book number 83 is "2", the representative quantization vector of the second code book 90 corresponding to the address 84 is reproduced as the decoded vector 87.

Furthermore, when the code book number 83 is "3", the representative quantization vector of the third code book 91 corresponding to the address 84 is reproduced as the decoded vector 87.

When the code book number 83 is "0", the representative quantization vector corresponding to the unique block is reproduced as the decoded vector 87.

It is to be understood that in the course of the above-described process, the code book control unit 92 operates to allow the decoded vector 87 to be written in a predetermined address in the frame memory 88.

According to the third embodiment of the present invention as described above, since a representative quantization vector is determined by using, in addition to a first code book including standard representative quantization vectors, a second code book formed by using a quantized area adjacent to an input vector and a third code book which sequentially stores areas including unique input vectors extracted based on the minimum distortion, efficient encoding utilizing local properties of the input vectors can be attained.

Figure 17:
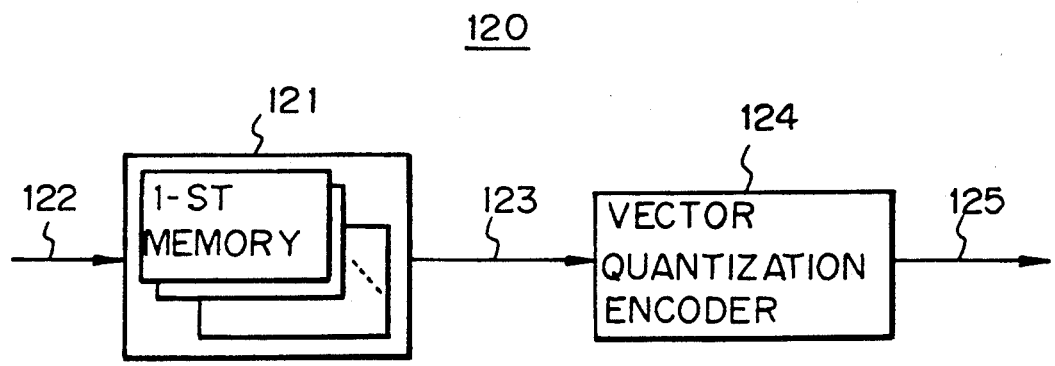
FIGS. 17 and 18 are block diagrams of an encoder section and a decoder section, respectively, of the fourth embodiment of an encoding/decoding system according to the present invention.
Figure 18:
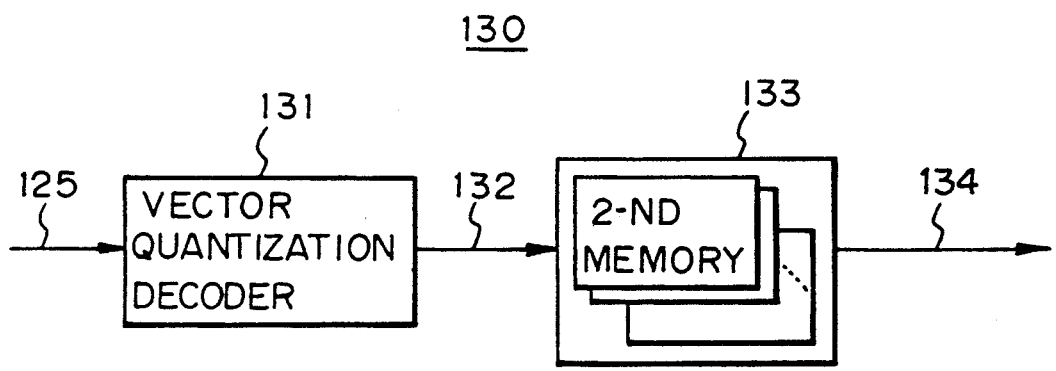
Figure 19:
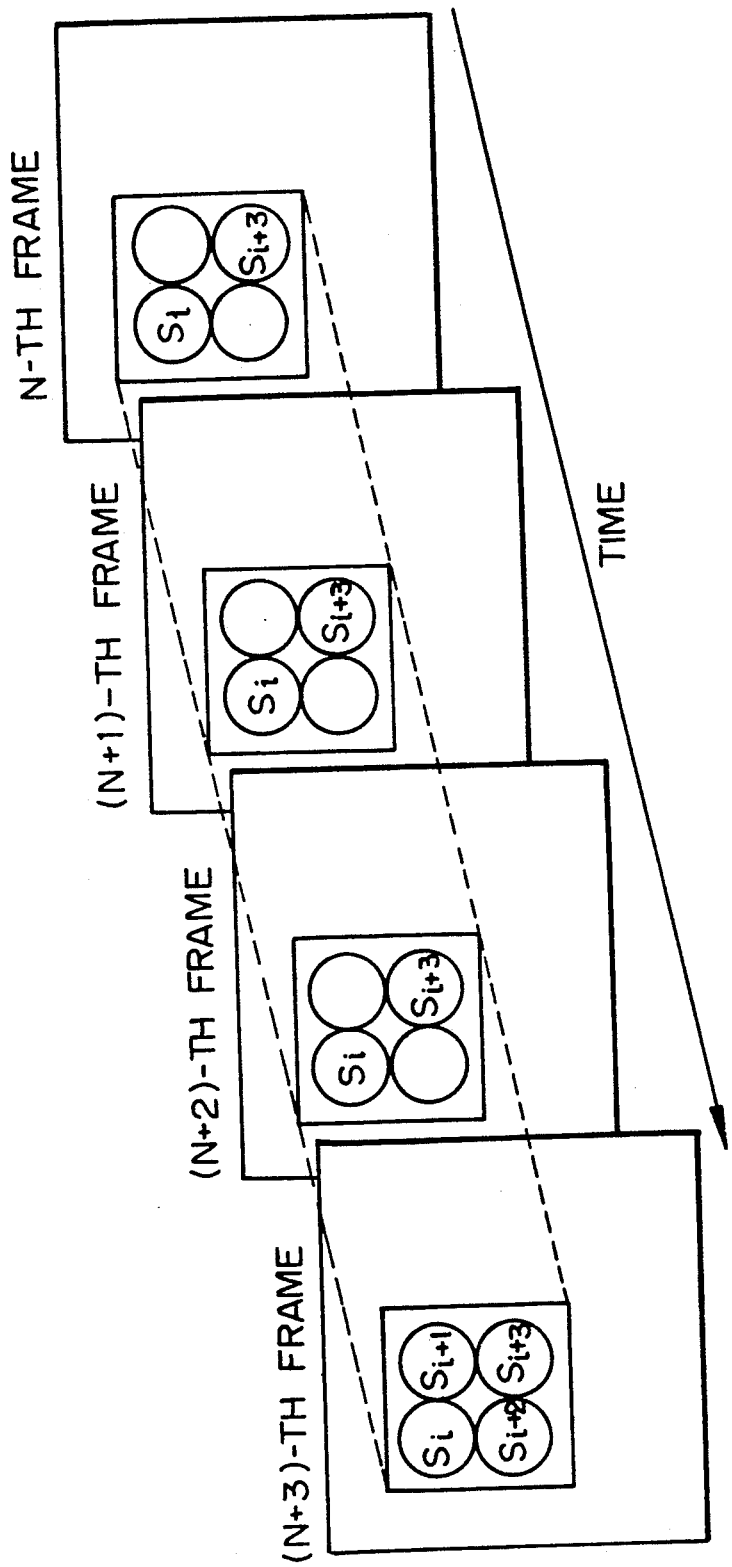
FIG. 19 is used for explaining an operation of the encoding/decoding system shown in FIGS. 17 and 18.

FIG. 17 through FIG. 19 illustrate a vector quantization encoding/decoding system as the fourth embodiment of an encoding/decoding system according to the present invention which utilizes time and space correlations of input signal sequences.

FIG. 17 illustrates the constitution of an encoding section 120 for vector-quantizing image signals in the fourth embodiment. In FIG. 17, a first memory 121 including L frame memories is adapted to temporarily store a sequence of digital image signals having a length equivalent to L frames. From the image signals stored in each frame memory, K image signals which occupy the same position in the respective frames are extracted such that $K \times L$ signals are spatially continuous. Thus the signal sequences 123 each comprising $K \times L$ image signals are output sequentially from the first memory 121. Each signal sequence 123 is encoded by a vector quantization encoder 124 and a vector quantization index 125 is output.

FIG. 18 illustrates the constitution of a decoding section 130 adapted to decode the vector quantization index 125 sent from the encoding section 120. A vector quantization decoder 131 is adapted to decode the vector quantization index 125 received from the vector quantization encoder 124 and correspondingly output a signal sequence 132 having $K \times L$ image signals. A second memory 133 has L frame memories and is adapted to store the signal sequence 132 such that K consecutive signals are stored in each of L frame memories in the second memory 133. The image signal sequence thus stored is read out in the natural order, for example, the order of raster scanning.

An operation of this system will next be explained.

The sequences of digital image signals 122 of continuous L frames is input to the first memory 121 and temporarily stored therein.

From each of L frame memories in the first memory 121, the image signals corresponding to K picture elements are taken out. These $K \times L$ picture elements are spatially continuous and K picture elements are located at the same positions in each frame. In this way, $K \times L$ image signals are grouped to a blocks to form the signal sequence 123.

Grouping in such a block as mentioned above will be explained by referring to FIG. 19. In this example, L and K are respectively assumed to be four. The image signals corresponding to four picture elements $S_i \sim S_{i+3}$ (two vertical and two horizontal elements) which are located in the same location in each frame are taken out of each of the n-th $\sim$ (n+3)-th frames and $4 \times 4 = 16$ image signals are arranged in series. Thus, $4 \times 4 = 16$ image signals are taken out of four frames to form a block such that the signal sequence 123 may be attained. Then, the signal sequence 123 thus obtained subjected to vector quantization at the vector quantization encoder 124 and the vector quantization index 125 is output. The index 125 provides a basic form of data to be transmitted or recorded as encoded data. At the decoding section 130, the vector quantization index 125 is decoded by the vector quantization decoder 131 to provide the image signal sequence 132 comprising the image signals having a length of four frames which are written in the second memory 133. When these image signals have been written into the memory 133, the content stored in the second memory 133 is read out in accordance with the natural order, for example, the order of raster scanning to provide the sequence of digital image signals 134.

According to the vector quantization encoding/decoding system as explained above, image signals having a length of L frames are stored, and then image signals corresponding to $K \times L$ picture elements which are spatially continuous and located at the same position in the respective frames are grouped in a block and read out. This block is subjected to vector quantization encoding as an input vector. More specifically, the vector quantization encoding is completed in four consecutive frames, and time and space correlations are utilized. In the decoding section, an image signal sequence equivalent to four consecutive frames is stored in the second memory and the stored image signals are read out of the respective frames in the natural order. In this way, time and space correlations are utilized whereby a data compression ratio can be enhanced. Since the encoding is completed in the range of a signal sequence grouped in a block with respect of time, encoding stability against errors may be attained and decoding may be possible from any one of the L consecutive frames.

Although according to the above-explained embodiment, the number of frames to be grouped in a block in respect of time has been assumed 4 and the number of picture elements to be grouped in respect of space has been assumed $2 \times 2 = 4$, the present invention is not limited to these figures. It is noted that the first memory 121 and the second memory 133 should have capacities two times as large as the number of frames L to be grouped in a block in respect of time and thus double buffer control must be executed in such a way as half of the capacity is allocated for reading and writing, respectively.

As explained above, according to the present invention, time and space correlations are so utilized for vector quantization that the efficiency of vector quantization can be enhanced. Furthermore, since the encoding process is completed in the frames forming a block, an error due to noise propagates is a quite narrow range and decoding may be commenced from any block in case where encoded data are stored in a storage type medium.

What is claimed is:

1. An encoding/decoding system for improving encoding efficiency, comprising:
   an encoding means for receiving and encoding an input digital signal to produce a first piece of encoded data;
   a first sequential list means for receiving and storing the first piece of encoded data, said first sequential list outputting a list address indicating where the first piece of encoded data is stored and moving the stored first piece of encoded data to a predetermined location in said list when encoding is performed by the encoding means, so as to update said first sequential list means;

a variable length encoding means for effecting variable length encoding of the list address provided by said first sequential list based on how often the list address of the first encoded data is accessed to store data, said variable length encoding means producing an encoded word that encodes the list address;

a variable length decoding means for receiving the encoded word from said variable length encoding means to effect variable length decoding of the received encoded word so as to recover the list address;

a second sequential list means for receiving the list address sent from said variable length decoding means and using said decoded list address to locate a second piece of encoded data held in the second sequential list means; and a decoding means for decoding the second piece of encoded data to output a digital signal corresponding to the input signal.

2. An encoding/decoding system as claimed in claim 1 wherein said first and second sequential list means store data in the same order.

3. An encoding/decoding system as claimed in claim 2 wherein said first and second sequential list means operate to move data from its current location to a location ($\alpha \log_r N + B$) prior to the current location; where $\alpha$ and B are arbitrary integers and N is the number of pieces of data stored in said list means and r is an integer greater than or equal to 2.

4. A vector quantization encoding/decoding system, comprising:

an encoding means for encoding a means value of an input vector, an output vector index of said input vector and a gain factor to be realized by said encoding/decoding system, to produce an encoded mean value, an output vector index and an encoded gain factor, wherein said encoding is based on how often said mean value, said output vector index and said gain factor are encoded so that more frequently encoded mean values, output vector indexes and gain factors have a shorter length than less frequently encoded mean values, output vector indexes and gain factors, respectively;

a first sequential list means for receiving and storing the encoded mean value of the input vector at a location within said first sequential lists means, said first sequential list means outputting a list address of the location in which the encoded mean value is stored and moving the stored encoded mean value to a predetermined first location when encoding is performed by said encoding means, so as to update the first list means;

a second sequential list means for receiving and storing the encoded gain factor at a location within said second sequential list means, said second sequential list means outputting a list address of the location in which the encoded gain factor is stored and moving the stored encoded gain factor to a predetermined second location when encoding is performed by said encoding means, so as to update the second list means;

a third sequential list means for receiving and storing the encoded output vector index of the input vector at a location within said third sequential list means, said third sequential list means outputting a list address of the location in which the encoded vector index is stored and moving the stored encoded vector index to a predetermined third location when encoding is performed, so as to update the third list means;

a variable length encoding means for effecting variable length encoding of the list addresses output from said first, second and third sequential list means to produce encoded data as output;

a variable length decoding means for decoding the encoded data from said variable length encoding means to recover data held in locations of the list addresses in the first, second and third sequential list means, respectively, wherein said mean value, gain factor and output vector index are stored; and a decoding means for decoding the recovered data to obtain data corresponding to the input signal.

5. A vector quantization encoding/decoding system as claimed in claim 4, further comprising a mean value separating means for receiving the input vector to supply the mean value of the input vector and a vector resulting from the of the mean value from the input vector to the encoding means.

6. A vector quantization encoding/decoding system as claimed in claim 5, further comprising a vector quantization encoding means for calculating an inner product of the vector resulting from the separation of the mean value from the input vector and a normalized output vector; and a maximum innner product detecting means for detecting a maximum inner product out of the inner products calculated by said vector quantization encoding means so as to supply the maximum inner product to said encoding means.

7. A vector quantization encoding/decoding system as claimed in claim 5 wherein said first, second and third predetermined are locations in the corresponding sequential list means having the lowest addresses.

8. A vector quantization encoding/decoding system for improving encoding efficiency, comprising:

a frame storage means for storing a frame of input signals;

a block control means for receiving a predetermined number of input signals from said frame storage means and outputting an input vector comprising the input signals and property data indicative of properties of the input vector generated by a property data generator of said block control means;

a first code book means for storing a plurality of representative quantization vectors and outputting said representative quantization vectors in response to a control signal;

a second code book means for storing a plurality of vectors of input signals which are adjacent to the input signals of the input vector in said frame of input signals, said second code book means outputting vectors of adjacent input signals in response to a control signal;

a third code book means for storing a block of input signals in said frame of input signals, including the input vector, said third code book means outputting a block of input signals in response to a control signal;

control means for generating control signals which control output of said first, second and third code book means;

a vector quantization encoding means for effecting vector quantization encoding of the input vector on the basis of an output from said block control means and an output from one of said first, second and third code book means, said vector quantization encoding means including distortion detection means for detecting maximum distortion and maximum distortion of the input vector in a representative quantization vector and said vector quantization encoding means outputting, a respective quantization vector and secondary property data indicative of secondary properties of the representative quantization vector if the minimum distortion at the time of vector quantization is larger than a predetermined value;

a first memory means for storing the representative quantization vector output from said vector quantization encoding means in a predetermined address of said first memory means as decoding vector;

a second memory means for storing a block of input signals in a predetermined address if the minimum distortion at the time of vector quantization is larger than a predetermined value in said vector quantization encoding means;

a first code book control means for causing the contents of said first and second memory means to be transferred to said second and third code bool means, respectively, when a new representative quantization vector is output from said vector quantization encoding means;

an encoder means for encoding, either the secondary property data or a combination of the secondary property data and the block of input signals in accordance with the secondarty property data, as output encoded data;

a decoder means for receiving and decoding the encoded data from said encoder means to recover either the secondary property data or the combination of the block of input signals and the secondary property data; and a vector quantization decoding means for effecting the vector quantization decoding of the information recovered from said decoder means to recover a decoded vector that is output.

9. A vector quantization encoding/decoding system as claimed in claim 8 wherein said vector quantization decoding means includes an additional set of three code book means the contents of which are the same as first, second and third code book means, respectively, and a second code book control means for controlling said additional set of three code book means in a manner similar to said first code book control means.

10. A vector quantization encoding/decoding system as claimed in claim 9 wherein the frame of input signals comprise image data signals, and wherein said first property data comprise a block size of the input vector and an address of the input vector in the frame and said secondary property data comprise at least a code book number indicating which one of said first, second and third code book means has been used when the vector quantization coding is performed.

11. A vector quantization encoding/decoding system for a sequence of image signals, comprising:

a first memory means for receiving and storing a sequence of image signals, said first memory means having sufficient memory capacity to hold a sequence of image signals equal to L frames of image data;

a vector quantization encoding means for receiving L consecutive blocks of K image signals constituting K signals occupying the same area in each of L frames, which are sequentially read out of said first memory means and for effecting vector quantization encoding of each block as an input vector wherein said blocks are encoded so that more frequently occurring vectors are encoded with shorter codes, and for transmitting the encoded input vector and a quantization index corresponding to the encoded input vector;

a vector quantization decoding means for receiving and effecting the vector quantization decoding of the quantization index to output decoded image signals; and a second memory means for storing the decoded from the vector quantization decoding means.

12. A vector quantization encoding/decoding system as claimed in claim 11 wherein said first and second memory means are L frame memories.

* * * * *